(12) United States Patent
Jungwirth

(10) Patent No.: US 9,243,776 B1
(45) Date of Patent: Jan. 26, 2016

(54) SOLAR SIMULATOR AND METHOD FOR SOLAR SIMULATION

(71) Applicant: The Boeing Company, Chicago, IL (US)

(72) Inventor: Douglas R. Jungwirth, Porter Ranch, CA (US)

(73) Assignee: The Boeing Company, Chicago, IL (US)

(*) Notice: Subject to any disclaimer, the term of this patent is extended or adjusted under 35 U.S.C. 154(b) by 318 days.

(21) Appl. No.: 13/959,086

(22) Filed: Aug. 5, 2013

(51) Int. Cl.
  *H05B 37/02* (2006.01)
  *H05B 39/04* (2006.01)
  *H05B 41/36* (2006.01)
  *F21V 9/02* (2006.01)

(52) U.S. Cl.
  CPC . *F21V 9/02* (2013.01); *H05B 37/02* (2013.01)

(58) Field of Classification Search
  USPC .................................................. 315/149–159
  See application file for complete search history.

(56) References Cited

U.S. PATENT DOCUMENTS

| | | | | |
|---|---|---|---|---|
| 5,524,133 | A * | 6/1996 | Neale et al. | 378/53 |
| 8,016,439 | B2 | 9/2011 | Igari | |
| 8,198,821 | B2 | 6/2012 | Shimotomai et al. | |
| 8,378,661 | B1 | 2/2013 | Cravey | |
| 2005/0238219 | A1* | 10/2005 | Roux et al. | 382/131 |
| 2007/0290621 | A1* | 12/2007 | Clark et al. | 315/113 |
| 2011/0163222 | A1* | 7/2011 | Moser | 250/203.4 |
| 2011/0241549 | A1* | 10/2011 | Wootton | 315/117 |

* cited by examiner

*Primary Examiner* — Brandon S Cole
(74) *Attorney, Agent, or Firm* — Walters & Wasylyna LLC

(57) ABSTRACT

A solar simulator including a support structure, two or more lighting modules connected to the support structure, wherein each lighting module includes a mounting structure and at least one multi-lamp assembly connected to the mounting structure, and a mobile sensor platform configured to sense light intensity and/or light spectrum.

38 Claims, 16 Drawing Sheets

SOLAR SIMULATOR AND METHOD FOR SOLAR SIMULATION

FIELD

This application relates to illumination and, more particularly, to artificial solar illumination.

BACKGROUND

During the design and manufacture of solar cells, there is often a need to test the cells for power generation and overall operating efficiency. One option for testing solar cells is exposing the solar cells to natural sunlight, as if the solar cells were in deployment. However, for a variety of reasons, it is often not practical (or even feasible) to expose test solar cells to natural sunlight.

Thus, solar simulators have been developed as an alternative to testing solar cells with natural sunlight. Advantageously, solar simulators use artificially generated light, such as light produced by electrically powered lamps, which facilitates the indoor testing of solar cells under carefully controlled laboratory conditions.

Use of solar simulators has not been limited to solar cells. Indeed, solar simulators have been used to test various objects. For example, solar simulators have been used to test objects, such as building materials, automobiles, aircraft and space vehicles, for thermal and ultraviolet exposure issues.

Unfortunately, many traditional solar simulators produce a limited area of illumination and are not scalable to accommodate larger objects. Therefore, many traditional solar simulators are not suitable for testing objects, such as large solar arrays, building materials, automobiles, aircraft and space vehicles.

Furthermore, while the illumination produced by traditional solar simulators may resemble the spectral distribution of natural sunlight, there are often discrepancies in the spectral distribution, the spatial uniformity, the angle of propagation and the divergence of the generated illumination, which may compromise test results. For example, concentrated photovoltaic (CPV) devices focus light onto a small area of solar cells and, therefore, require precise spatial uniformity, spectral balance, angle of propagation and divergence to adequately simulate solar illumination.

Accordingly, those skilled in the art continue with research and development efforts in the field of artificial solar illumination.

SUMMARY

In one embodiment, the disclosed solar simulator may include (1) a support structure and (2) a plurality of lighting modules connected to the support structure, wherein each lighting module includes a mounting structure and at least one multi-lamp assembly connected to the mounting structure.

In another embodiment, the disclosed solar simulator may include (1) a support structure; (2) a plurality of lighting modules connected to the support structure to illuminate a target area, wherein each lighting module includes a mounting structure and at least one multi-lamp assembly connected to the mounting structure; and (3) a mobile sensor platform including a support structure, a sensor connected to the mobile sensor platform support structure and an ambulation system connected to said support structure to move said mobile sensor platform within the target area.

In another embodiment, the disclosed method for solar simulation may include the steps of (1) providing a plurality of lighting modules that output light, each lighting module including a multi-lamp assembly; (2) arranging the lighting modules into an array, the array defining a target area of illumination; (3) moving a sensor to various discrete locations within the target area; (4) measuring light intensity and/or light spectrum at each of the discrete locations; and (5) based on the measuring step, modifying the light output by at least one of the lighting modules.

In another embodiment, the disclosed solar simulator may include (1) a collimated light beam and (2) a mobile sensor platform moveable between a plurality of discrete locations within the collimated light beam, wherein the mobile sensor platform includes at least one optical sensor and a robotic arm.

In another embodiment, the disclosed solar simulator may include (1) a light source configured to generate an initial light beam; (2) an optical element positioned to receive the initial light beam and output a collimated light beam; and (3) a mobile sensor platform moveable between a plurality of discrete locations within the collimated light beam, wherein the mobile sensor platform includes (a) a sensor component configured to collect at each discrete location data indicative of divergence of the collimated light beam, direction of the collimated light beam, spectrum of the collimated light beam and/or spatial uniformity of the collimated light beam; and (b) a correction component configured to position an obscuration within the collimated light beam.

In another embodiment, the disclosed method for solar simulation may include the steps of (1) generating a collimated light beam; (2) moving a mobile sensor platform to a plurality of discrete locations within the collimated light beam; (3) at each discrete location of the plurality of discrete locations, collecting with the mobile sensor platform data indicative of a plurality of parameters; (4) for each discrete location of the plurality of discrete locations, determining whether any of parameters are outside of predefined specifications; and (5) positioning obscurations in said collimated light beam.

In yet another embodiment, the disclosed method for solar simulation may include the steps of (1) generating a collimated light beam; (2) moving a mobile sensor platform to a plurality of discrete locations within the collimated light beam; (3) at each discrete location of the plurality of discrete locations, collecting with the mobile sensor platform data indicative of divergence of the collimated light beam, direction of the collimated light beam, spectrum of the collimated light beam and/or spatial uniformity of the collimated light beam; (4) for each discrete location of the plurality of discrete locations, determining whether the divergence of the collimated light beam, the direction of the collimated light beam, the spectrum of the collimated light beam and/or the spatial uniformity of the collimated light beam are outside of predefined specifications; and (5) positioning obscurations in said collimated light beam to bring the spectrum of the collimated light beam and/or the spatial uniformity of the collimated light beam within the predefined specifications.

Other embodiments of the disclosed solar simulator and method for solar simulation will become apparent from the following detailed description, the accompanying drawings and the appended claims.

DETAILED DESCRIPTION

Figure 1:
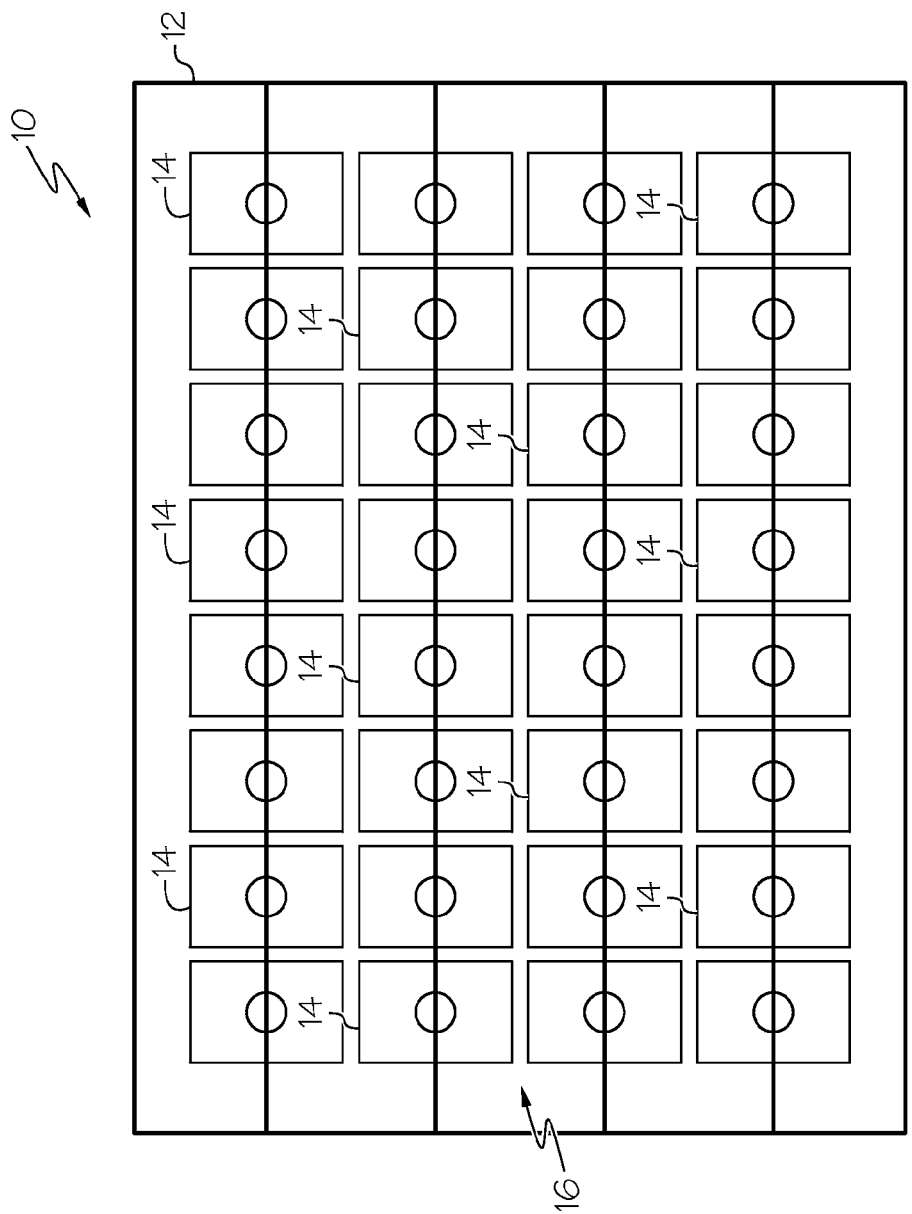
FIG. 1 is a top plan view of one embodiment of the disclosed solar simulator.

The following detailed description refers to the accompanying drawings, which illustrate specific embodiments of the disclosure. Multiple embodiments are disclosed. Other embodiments having different structures and operations do not depart from the scope of the present disclosure. Like reference numerals may refer to the same element or component in the different drawings.

Figure 2:
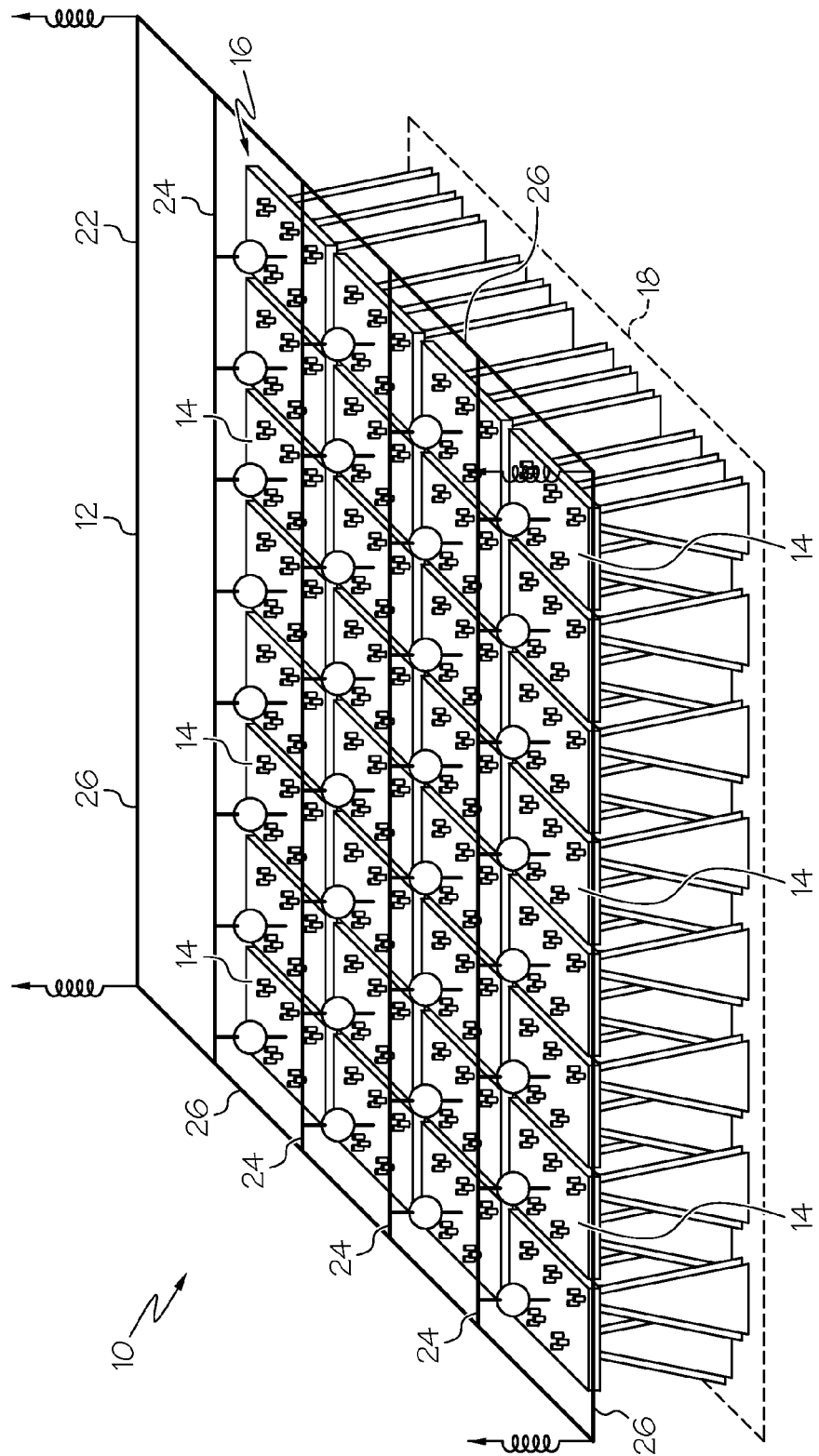
FIG. 2 is a front and side perspective view of the solar simulator of FIG. 1, shown illuminating a target area.

Referring to FIGS. 1 and 2, one embodiment of the disclosed solar simulator, generally designated 10, may include a support structure 12 and a plurality of lighting modules 14. The solar simulator 10 may include additional components, such as a controller 70 (FIGS. 6 and 8), without departing from the scope of the present disclosure.

The lighting modules 14 may be arranged in an array 16 to illuminate a target area 18 (FIG. 2). The target area 18 may be any area illuminated by the solar simulator 10. In operation, the target area 18 may be the surface of interest of an object-under-test (not shown), such as, for example, the surface of a solar cell (or solar cell array), the skin of an aircraft or the painted surface of an automobile.

As best shown in FIG. 1, the solar simulator 10 includes thirty-two lighting modules 14 (four rows of eight lighting modules 14) arranged in a substantially flat, planar array 16. However, the array 16 may include any number of lighting modules 14 (e.g., at least two rows of lighting modules 14 with at least two lighting modules 14 per row) without departing from the scope of the present disclosure. For example, the total number of lighting modules 14 in the array 16 may be dictated by the total surface area of the target area 18 and the size of each lighting module 14.

Thus, the modularity of the disclosed solar simulator 10 may facilitate illuminating a relatively large target area 18. For example, when a sufficient number of lighting modules 14 are used, the target area 18 may be 2000 ft$^2$ or more, which may be sufficient for various solar applications and aerospace applications.

Furthermore, while the array 16 is shown in FIG. 1 as a substantially planar, two-dimensional array 16, the lighting modules 14 may also be arranged as a three-dimensional array. As one alternative example, the lighting modules 14 may be arranged as a curvilinear array (not shown). As another alternative example, the lighting modules 14 may be arranged as a cylindrical array (not shown). As yet another alternative example, the lighting modules 14 may be arranged as a spherical array (not shown).

Thus, the configuration of the array 16 (e.g., flat or curved) may be selected to accommodate the configuration of the target area 18. The target area 18 need not be a flat two-dimensional area, but rather may be curved or may be the entire outer surface (or a portion of the outer surface) of a three-dimensional object (e.g., an aircraft).

The support structure 12 may be any apparatus or system capable of securely retaining the lighting modules 14 in the array 16. Optionally, fasteners 20 (FIG. 2), such as cables, ropes, chains, brackets or the like, may be provided for connecting (e.g., suspending) the support structure 12 to another, secondary structure (not shown), such as the ceiling of a building, a crane or the like.

In one particular construction, the support structure 12 may include a frame 22 and a plurality of cross members 24. The frame 22 may include frame members 26 connected together to form a substantially rectangular frame 22. The cross members 24 may extend across the frame 22 and may be spaced apart from each other. For example, each cross member 24 may be connected to the frame 22 to support an associated row of lighting modules 14 in the array 16. Therefore, the number of cross members 24 may be dictated by the number of rows of lighting modules 14 in the array 16.

Figure 3:
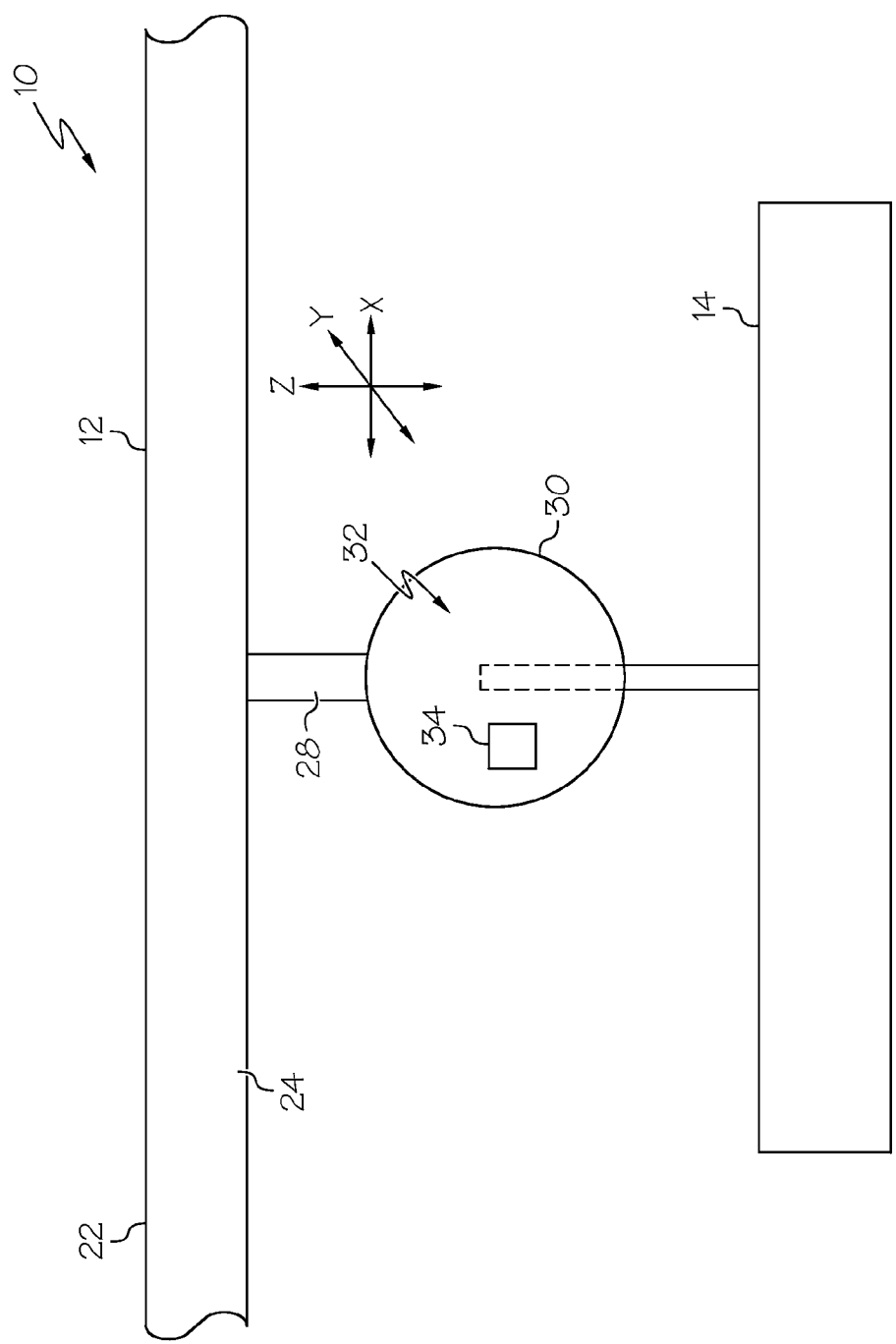
FIG. 3 is a side elevational view of a portion of the solar simulator of FIG. 1.

Referring to FIG. 3, each lighting module 14 may be suspended from an associated cross member 24 of the support structure 12. For example, a tie member 28, such as a rod or cable, may extend from the lighting module 14 to the cross member 24 to connect the lighting module 14 to the support structure 12.

Optionally, an articulation mechanism 30 may be disposed between the each lighting module 14 (or only some lighting modules 14) and the support structure 12. The articulation mechanism 30 may facilitate three-dimensional articulation of the lighting modules 14 relative to the support structure 12.

The articulation mechanism 30 may employ various structure and techniques to articulate the associated lighting module 14. Furthermore, each articulation mechanism 30 may be independently controlled such that each lighting module 14 in the array 16 may be independently articulable to the desired orientation.

As one specific, non-limiting example, the articulation mechanism 30 may include a flexible connection 32 between the lighting module 14 and the support structure 12. For example, the flexible connection 32 may include one or more hinges and/or a ball-and-socket joint. Additionally, the articulation mechanism 30 may include one or more motion devices 34. For example, the motion device 34 may include actuators and/or servomotors. Upon actuation of the motion device 34 of the articulation mechanism 30, the associated lighting module 14 may move relative to the support structure 12 about the flexible connection 32.

Thus, the lighting modules 14 may be connected to the support structure 12 such that the lighting modules 14 are positioned over the target area 18. Therefore, when the lighting modules 14 are articulated to the required orientation and activated, the solar simulator 10 may illuminate the target area 18.

Figure 4:
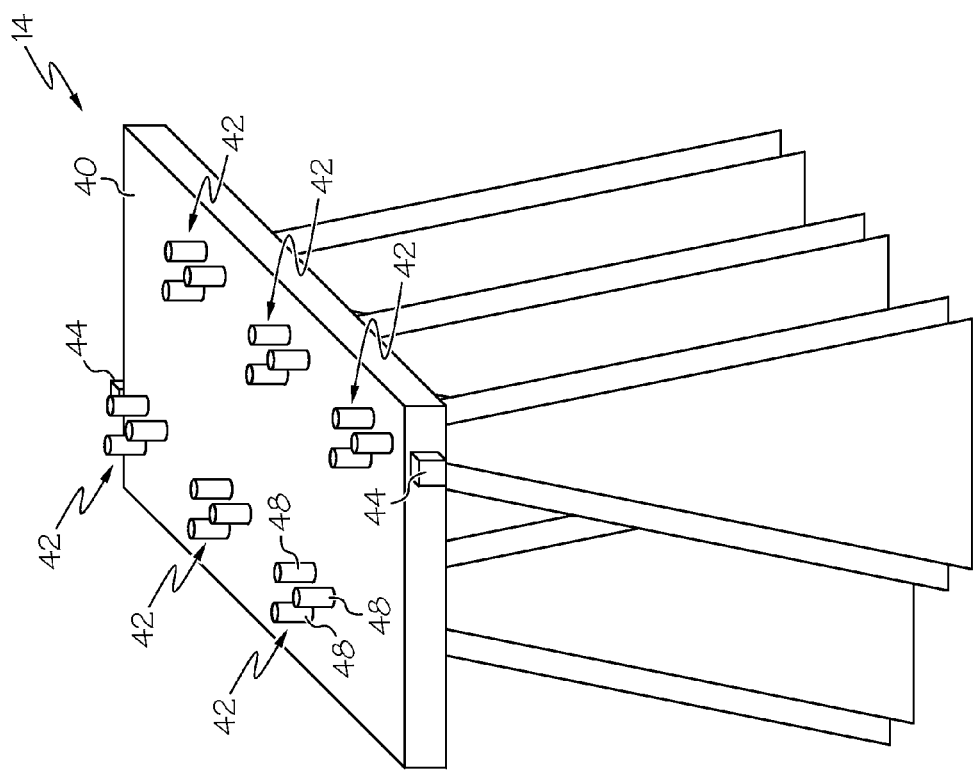
FIG. 4 is a front and side perspective view of one lighting module of the solar simulator of FIG. 1.

Referring to FIG. 4, each lighting module 14 may include a mounting structure 40, a multi-lamp assembly 42 and electrical interconnects 44. The lighting module 14 shown in FIG. 4 includes six multi-lamp assemblies 42. Lighting modules 14 with fewer than six multi-lamp assemblies 42 or more than six multi-lamp assemblies 42 may be used without departing from the scope of the present disclosure.

The mounting structure 40 may be any structure to which the multi-lamp assemblies 42 may be mounted. For example, the mounting structure 40 may be a board or panel configured to securely retain the multi-lamp assemblies 42 on the lighting module 14. Optional fasteners (not shown), such as mechanical fasteners, may be used to secure the multi-lamp assemblies 42 to the mounting structure 40.

Each multi-lamp assembly 42 may be mounted to the mounting structure 40 and may be electrically coupled with the other multi-lamp assemblies 42 mounted to the associated mounting structure 40. The electrical interconnects 44 may facilitate electrically coupling the lighting module 14 to adjacent lighting modules 14 in the array 16 (FIG. 1). The electrical interconnects 44 may also facilitate reconfiguring the array 16 as desired.

Thus, each lighting module 14 in the array 16 may be electrically interconnected. Alternatively, rather than each lighting module 14 in the array 16 being electrically interconnected, the array 16 may include two or more groups of electrically interconnected lighting modules 14. For example, only the lighting modules 14 in a column of the array 16 (eight columns are shown in FIG. 1) may be electrically interconnected.

Figure 5:
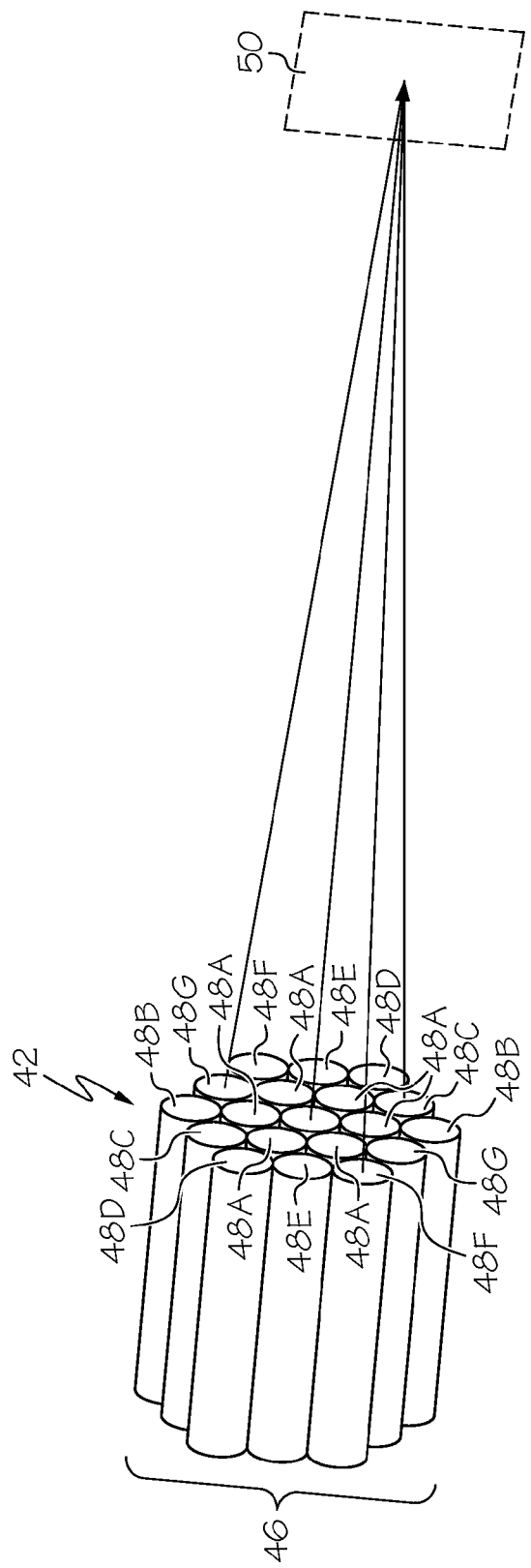
FIG. 5 is a schematic representation of one multi-lamp assembly of the lighting module of FIG. 4, shown illuminating a target plane.

Referring to FIG. 5, each multi-lamp assembly 42 may include an array 46 of lamp modules 48A, 48, 48C, 48D, 48E, 48F, 48G (individually, a lamp module 48; collectively, lamp modules 48). The lamp modules 48 may be focused on, and may illuminate, a target plane 50 spaced away from the lamp modules 48.

Figure 6:
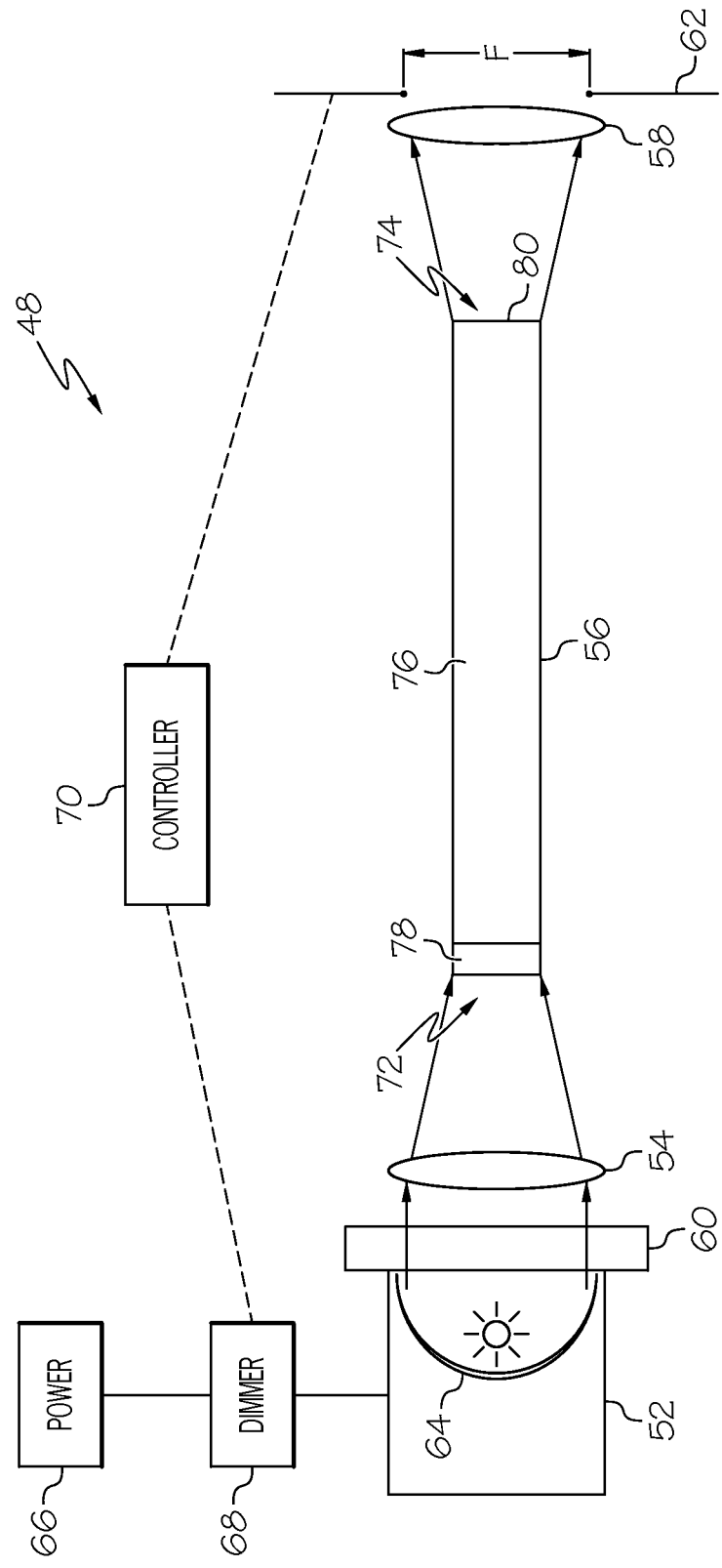
FIG. 6 is a detailed schematic representation of one lamp module of the multi-lamp assembly of FIG. 5.

Referring to FIG. 6, each lamp module 48 of the array 46 (FIG. 5) may include a lamp 52, a beam divergence lens 54, a homogenizer 56 and an imaging lens 58. Additionally, the lamp module 48 may include a spectral filter 60 and/or an iris 62.

The lamp 52 may generate the light (represented with arrows in FIG. 6) associated with the lamp module 48. The light may have an initial intensity. The lamp 52 may include a mirror 64 configured to project the generated light from the lamp 52 in the direction of interest.

The lamp 52 may be any suitable light source having a spectrum that overlaps the range from infrared to ultraviolet. In one particular construction, the lamp 52 may be a light source capable of generating full spectrum light (i.e., light that substantially covers the electromagnetic spectrum from proximate the infrared to proximate the near ultraviolet). As one specific, non-limiting example, the lamp 52 may be a xenon arc lamp and may have a color temperature of about 6,000° K to about 6,500° K. Suitable xenon arc lamps are commercially available from Excelitas Technologies Sensors, Inc., of Waltham, Mass., under the CERMAX® brand. As another specific, non-limiting example, the lamp 52 may be a krypton arc lamp and may have a color temperature of about 5,500° K to about 6,000° K.

The lamp 52 may receive electrical energy from a power supply 66, such a battery or the electrical grid. The power supply 66 may be a shared power supply wherein each lamp module 48 of the array 46 (FIG. 5) may be powered by the same power supply. Alternatively, the lamp 52 of each lamp module 48 may have its own designated power supply.

Figure 8:
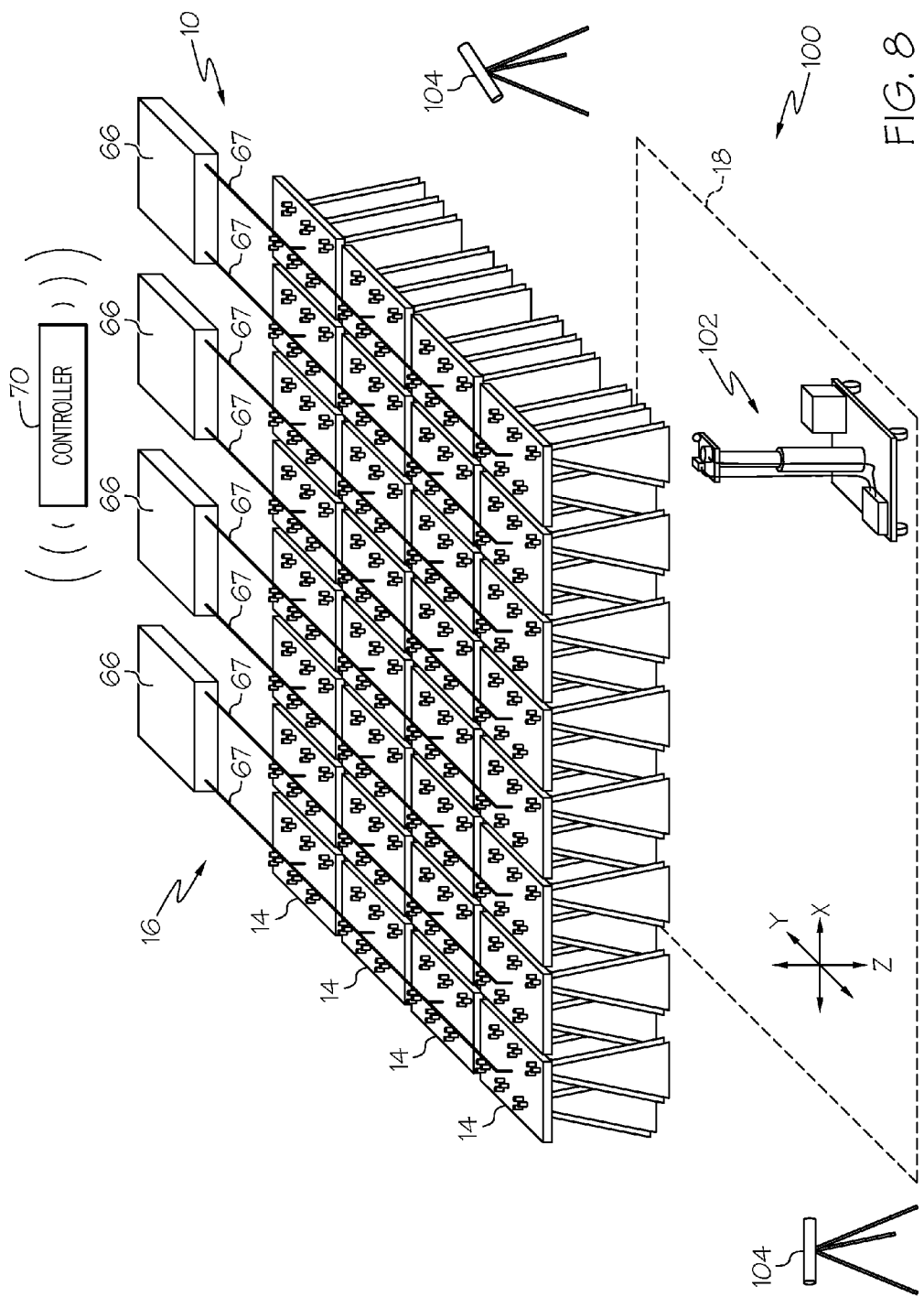
FIG. 8 is a perspective view of the calibration system of FIG. 7 calibrating the solar simulator of FIG. 2 (with the support structure removed for clarity)

As shown in FIG. 8, multiple lighting modules 14 in the array 16 may share the same power supply 66. For example, electrical leads 67 may distribute the electrical energy from the power supply 66 to the associated lighting modules 14. Optionally, each lighting modules 14 in the array 16 may share the same (e.g., a single) power supply 66.

A variable voltage/current device 68, such as a dimmer switch, may control the power supplied to the lamp 52 and, thus, the initial intensity of the light generated by the lamp 52. The variable voltage/current device 68 may be a manual device or, alternatively, may be controlled by a controller 70 (e.g., a computer processor), as described in greater detail herein. Each lamp module 48 of the array 46 (FIG. 5) may have its own designated variable voltage/current device 68 such that the power supplied to the lamp 52 of one lamp module 48 may be controlled independently of the other lamp modules 48 of the array 46.

The spectral filter 60 may be positioned to receive and filter the light generated by the lamp 52. Various spectral filters 60 may be used. As one example, the spectral filter 60 may filter the light generated by the lamp 52 to provide full spectrum illumination (i.e., illumination that substantially covers the electromagnetic spectrum from proximate the infrared to proximate the near ultraviolet). As another example, the spectral filter 60 may filter the light generated by the lamp 52 to provide light within a specific, non-full spectrum band (e.g., red, blue) of the electromagnetic spectrum.

The type of spectral filter 60 used may vary from lamp module 48 to lamp module 48 within the array 46 (FIG. 5). Selection of the type of spectral filter 60 used for a given lamp module 48 may depend on the intended application of the solar simulator 10 (FIG. 1) and the location of the lamp module 48 within the array 46, among other possible factors.

As one non-limiting example, each multi-lamp assembly 42 may include nineteen lamp modules 48A, 48B, 48C, 48D, 48E, 48F, 48G, as shown in FIG. 5. Lamp modules 48A (seven total in the array 46) may be positioned at the center of the array 46 and may include a spectral filter 60 (FIG. 6) that provides full spectrum illumination. Lamp modules 48B (two total in the array 46) may be positioned on the outside (proximate the periphery) of the array 46 and opposed from each other, and may include a spectral filter 60 that provides illumination in the red band (e.g., about 620 nm to about 750 nm) of the electromagnetic spectrum. Lamp modules 48C (two total in the array 46) may be positioned on the outside of the array 46 and opposed from each other, and may include a spectral filter 60 that provides illumination in the orange band (e.g., about 590 nm to about 620 nm) of the electromagnetic spectrum. Lamp modules 48D (two total in the array 46) may be positioned on the outside of the array 46 and opposed from each other, and may include a spectral filter 60 that provides illumination in the yellow band (e.g., about 570 nm to about 590 nm) of the electromagnetic spectrum. Lamp modules 48E (two total in the array 46) may be positioned on the outside of the array 46 and opposed from each other, and may include a spectral filter 60 that provides illumination in the green band (e.g., about 495 nm to about 570 nm) of the electromagnetic spectrum. Lamp modules 48F (two total in the array 46) may be positioned on the outside of the array 46 and opposed from each other, and may include a spectral filter 60 that provides illumination in the blue band (e.g., about 450 nm to about 495 nm) of the electromagnetic spectrum. Lamp modules 48G (two total in the array 46) may be positioned on the outside of the array 46 and opposed from each other, and may include a spectral filter 60 that provides illumination in the violet band (e.g., about 380 nm to about 450 nm) of the electromagnetic spectrum.

While the nineteen lamp modules 48A, 48B, 48C, 48D, 48E, 48F, 48G are shown in FIG. 5 in a closely packed hex pattern, those skilled in the art will appreciate that other patterns and combinations of lamp modules 48 may be used without departing from the scope of the present disclosure. For example, non-symmetrical and random configurations are also contemplated.

Furthermore, while lamp modules 48B, 48C, 48D, 48E, 48F, 48G are described above as being filtered to provide light within a specific visible band of the electromagnetic spectrum, filtering to provide an infrared band (e.g., about 1000 nm to about 750 nm) or an ultraviolet band (e.g., about 100 nm to about 380 nm) is also contemplated.

As another non-limiting example, each multi-lamp assembly 42 may include seven (not shown) lamp modules 48. A first lamp module 48 may be positioned at the center of the array 46 and may include a spectral filter 60 (FIG. 6) that provides full spectrum illumination. A second lamp module 48 may be positioned on the outside of the array 46 and may include a spectral filter 60 that provides illumination in the red band of the electromagnetic spectrum. A third lamp module 48 may be positioned on the outside of the array 46 and may include a spectral filter 60 that provides illumination in the orange band of the electromagnetic spectrum. A fourth lamp module 48 may be positioned on the outside of the array 46 and may include a spectral filter 60 that provides illumination in the yellow band of the electromagnetic spectrum. A fifth lamp module 48 may be positioned on the outside of the array 46 and may include a spectral filter 60 that provides illumination in the blue band of the electromagnetic spectrum. A seventh lamp module 48 may be positioned on the outside of the array 46 and may include a spectral filter 60 that provides illumination in the violet band of the electromagnetic spectrum. An eighth lamp module 48 may be positioned on the outside of the array 46 and may include a spectral filter 60 that provides illumination in the indigo band of the electromagnetic spectrum.

As yet another non-limiting example, each multi-lamp assembly 42 may include three lamp modules 48, as shown in FIG. 4. At this point, those skilled in the art will appreciate that the number of lamp modules 48 in each multi-lamp assembly 42 may vary without departing from the scope of the present disclosure.

Referring back to FIG. 6, the beam divergence lens 54 may focus the light generated by the lamp 52 onto the input end 72 of the homogenizer 56. Therefore, the beam divergence lens 54 may define the input and output divergence angle of the homogenizer 56.

The homogenizer 56 may receive the light from the beam divergence lens 54 and may spatially redistribute the light. Therefore, the output end 74 of the homogenizer 56 may output light having a substantially uniform spatial distribution.

The homogenizer 56 may include a waveguide 76 (or a plurality of waveguides 76) extending from proximate (at or near) the input end 72 to proximate the output end 74. The waveguide 76 may function due to total internal reflection or may be coated with a suitable high reflectivity coating. A diffuser 78 may be positioned proximate the input end 72 of the homogenizer 56 to diffract the incoming light. The output end 74 of the homogenizer 56 may include a polished surface 80.

The imaging lens 58 may receive the light from the output end 74 of the homogenizer 56 and may image the light onto the target plane 50 (FIG. 5). Those skilled in the art will appreciate that the focal length and placement of the imaging lens 58 may define the magnification of the imaged light at the target plane 50. As one specific, non-limiting example, the imaged light may have an illumination area on the target plane 50 of about 30 cm by about 30 cm. Of course, smaller or even larger illumination areas may be achieved.

The imaged light from the imaging lens 58 may pass through the iris 62 on its way to the target plane 50 (FIG. 5). The aperture size F of the iris 62 may be manipulated to control the percentage of imaged light that is projected onto the target plane 50. Specifically, the iris 62 may be opened (e.g., aperture size F increased) to project a larger percentage of imaged light onto the target plane 50 or may be closed (e.g., aperture size F reduced) to project a smaller percentage of imaged light onto the target plane 50. Those skilled in the art will appreciate that changing the percentage of light transmitted by way of the iris 62 may not result in a change in the spatial distribution of the transmitted light.

In one variation, the iris 62 may be a manual iris, such as an iris diaphragm that opens or closes in response to rotation, such as is used in a manual camera lens. In another variation, the iris 62 may be a motorized iris. When the iris 62 is motorized, the controller 70 may be in communication with the iris 62 to provide command instructions such that the aperture size F is increased or decreased by the controller 70.

Thus, each lamp module 48 of the array 46 may be imaged onto the target plane 50 (e.g., the surface of a solar cell), as shown in FIG. 5. The baseline (full) spectrum of the illumination on the target plane 50 may be adjusted up or down by controlling the intensity of the full spectrum lamp modules 48A (FIG. 5), such as by manipulating the variable voltage/current devices 68 (FIG. 6) and/or the irises 62 (FIG. 6) for those lamp modules 48A. The spectral distribution of the illumination on the target plane 50 may be modified by controlling the intensity of lamp modules 48B, 14C, 14D, 14E, 14F, 14G (FIG. 5), such as by manipulating the variable voltage/current devices 68 (FIG. 6) and/or the irises 62 (FIG. 6) for those lamp modules 48B, 14C, 14D, 14E, 14F, 14G.

Thus, the illumination generated by the disclosed solar simulator 10 may be actively controlled. The entire area illuminated by the solar simulator may be dimmed as desired or gradients, such as spatial gradients or temporal gradients, may be applied.

Figure 7:
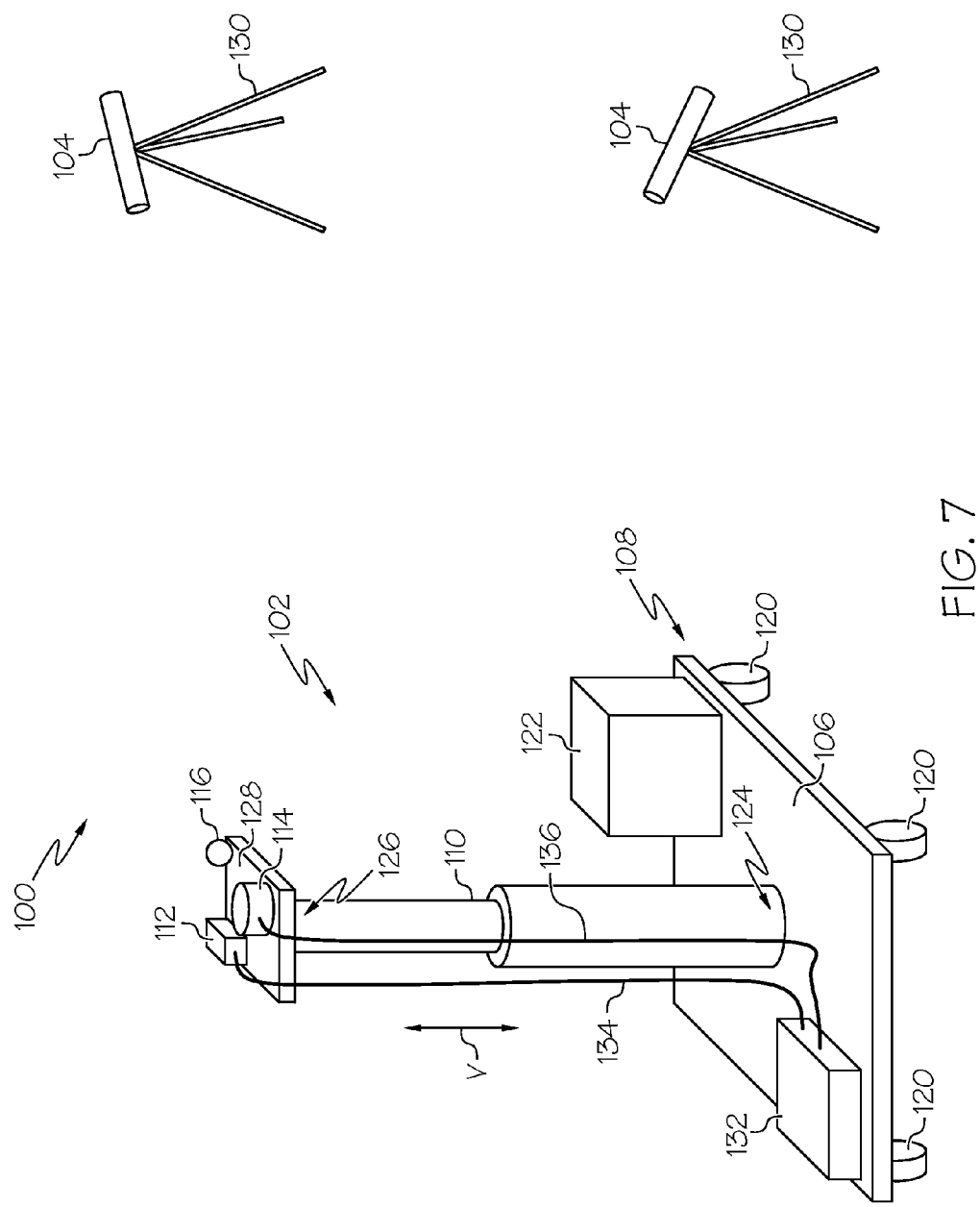
FIG. 7 is a perspective view of one embodiment of the disclosed calibration system.

Referring to FIG. 7, also disclosed is a calibration system, generally designated 100, for calibrating a solar simulator, such as the solar simulator 10 shown in FIGS. 1 and 2. The calibration system 100 may include a mobile sensor platform 102 and one or more position-tracking devices 104 (two are shown in FIG. 7).

The mobile sensor platform 102 may include a support structure 106, an ambulation system 108, an elevator 110 and one or more sensors 112, 114. Additionally, the mobile sensor platform 102 may include a reference sphere 116 to facilitate tracking the mobile sensor platform 102 by the position-tracking devices 104.

The ambulation system 108 may be any apparatus or system capable of moving the mobile sensor platform 102 within the target area 18 (FIG. 8). The ambulation system 108 may be capable of moving the mobile sensor platform 102 to multiple discrete test locations within the target area 18.

Therefore, a test measurement may be taken at each test location within the target area 18.

In one particular realization, the ambulation system 108 may include ambulation devices 120 and a controller 122, both of which may be connected to the support structure 106. For example, the ambulation devices 120 may be wheels, tracks or the like, and may be driven by a motor, such as electric (e.g., battery powered) motor or other suitable power source. Each ambulation device 120 may include an associated motor or, alternatively, a single motor may drive the ambulation devices 120.

The controller 122 may be in communication with the controller 70 (FIG. 8) and the ambulation devices 120. For example, the controller 122 may be in wireless (e.g., Wi-Fi) communication with the controller 70 and wired (e.g., direct line) communication with the ambulation devices 120. Therefore, the controller 122 may control the ambulation devices 120 in response to command signals received from the controller 70 to effect the desired motion of the mobile sensor platform 102 within the target area 18 (FIG. 8).

The elevator 110 may be connected to the support structure 106 to raise and lower (along vertical axis V) the sensors 112, 114 as desired. The elevator 110 may include a first end 124 connected to the support structure 106 and an opposed second end 126 connected to the sensors 112, 114.

The elevator 110 may be any apparatus or system capable effecting the desired motion of the sensors 112, 114 along the vertical axis V. In one particular expression, the elevator 110 may be (or may include) a linear actuator. As one specific, non-limiting example, the elevator 110 may include one or more gears (e.g., a rack and pinion) arranged to effect linear motion. As another specific, non-limiting example, the elevator 110 may include a fluid (e.g., hydraulic or pneumatic) actuator.

A sensor support 128 may be connected to the second end 126 of the elevator 110. The sensors 112, 114 may be mounted on the sensor support 128 such that the sensors 112, 114 may move with the sensor support 128 along the vertical axis V in response to actuation of the elevator 110.

Optionally, an articulation mechanism (not shown) may be disposed between the sensor support 128 and the elevator 110 to facilitate three-dimensional articulation of the sensor support 128 and associated sensors 112, 114. Articulation of the sensor support 128 may facilitate altering the viewing angle of the sensors 112, 114. The articulation mechanism for articulating the sensors 112, 114 may be similar to the articulation mechanism described above for articulating the lighting modules 14 in the array 16 of the solar simulator 10.

The controller 122 may also be in communication (e.g., wired or wireless communication) with the elevator 110 and, if present, the articulation mechanism for articulating the sensors 112, 114. Therefore, the controller 122 may control the actuation of the elevator 110 (and, optionally, the articulation mechanism for articulating the sensors 112, 114) in response to command signals received from the controller 70 to achieve the desired vertical position (and, optionally, viewing angle) of the sensors 112, 114.

As shown in FIG. 8, the position-tracking devices 104 may be positioned outside of the target area 18 to track the position of the mobile sensor platform 102 within the target area 18. The position-tracking devices 104 may be in communication (e.g., wired or wireless communication) with the controller 70, and may communicate to the controller 70 data indicative of the position (e.g., x-y coordinates or x-y-z coordinates) of the mobile sensor platform 102 within the target area 18.

For example, the position-tracking devices 104 may be reference alignment scopes, and may employ one or more lasers to track the position of the mobile sensor platform 102 within the target area 18. Optionally, each position-tracking device 104 may be mounted on an associated support structure 130, such as a tripod.

Referring to FIG. 7, the reference sphere 116 of the mobile sensor platform 102 may facilitate tracking of the position of the mobile sensor platform 102 by the position-tracking devices 104. For example, the reference sphere 116 may be connected to the sensor support 128 in close proximity to the sensors 112, 114. Other locations on the mobile sensor platform 102 may also be used for mounting the reference sphere 116. Therefore, the position in space of the reference sphere 116, as ascertained by the position-tracking devices 104, may provide an accurate indication of the positions in space of the sensors 112, 114 (particularly when the position of the reference sphere 116 relative to the sensors 112, 114 is known).

The sensors 112, 114 may be any sensors capable of measuring the spectrum and intensity of the light generated by the solar simulator 10 (FIG. 8). Therefore, by controlling the ambulation system 108 and the elevator 110 of the mobile sensor platform 102, the sensors 112, 114 may be positioned at any desired location in space (within the target area 18 (FIG. 8)) below the solar simulator 10 (FIG. 8) to measure the spectrum and intensity of the light generated by the solar simulator 10 at that location.

Various sensors may be mounted on the mobile sensor platform 102. While two sensors 112, 114 are shown in FIG. 7 for sensing light spectrum and light intensity, use of other sensors is also contemplated.

In one particular implementation, sensor 112 may be a photovoltaic cell (or multiple photovoltaic cells) and sensor 114 may be an integrating sphere. In one variation, only photovoltaic cells may be used. In another variation, only on integrating sphere may be used. In yet another variation, a spectrometer may be used.

The sensors 112, 114 may be in communication with sensor electronics 132, such as by way of wired communication lines 134, 136 or wireless pathways. The sensor electronics 132 may be in communication (e.g., wireless communication) with the controller 70 (FIG. 8) to communicate to the controller 70 data (e.g., spectrum and intensity measurements) collected by the sensors 112, 114 at various locations within the target area 18 (FIG. 8).

Referring to FIG. 8, the controller 70 may direct the mobile sensor platform 102 to move the sensors 112, 114 to various locations in space (e.g., x-y-z coordinates) within the target area 18. Each location may correspond to a point on the surface of an object-under-test (not shown) once the object-under-test is positioned in the target area 18 (e.g., in a pre-determined position and orientation in the target area 18).

At each location, the mobile sensor platform 102 may perform a sensing operation. For example, at each location, the sensors 112, 114 may measure spectrum and intensity, each of which should be within a pre-determined acceptable range. If the measured spectrum and/or intensity falls outside of the pre-determined acceptable range, the controller 70 may determine which lighting module 14 (or modules 14) in the array 16, or even which multi-lamp assembly 42 within the lighting module 14, are responsible for that location and may make the necessary adjustments to the solar simulator 10. As one example, after identifying which lighting module 14 is responsible, the controller 70 may manipulate the power supply 66 (or power supplies 66) to that lamp module 14. As another example, the controller 70 may make a correction by manipulating the variable voltage/current devices 68 (FIG. 6) and/or the irises 62 (FIG. 6) for the responsible lamp module 48.

Thus, the mobile sensor platform 102 may move from location to location within the target area 18. At each location, the spectrum and intensity may be measured and, if necessary, an adjustment to the solar simulator 10 may be made. The mobile sensor platform 102 may continue to move from location to location within the target area 18 until the solar simulator 10 has been fully calibrated.

Once the solar simulator 10 has been fully calibrated, an object-under-test (not shown), such as a solar cell or an aircraft, may be positioned in the target area 18. Positioning of the object-under-test within the target area 18 may require care to ensure the object-under-test is positioned in the pre-determined position and orientation such that the surface of the object-under-test corresponds with the locations calibrated by the calibration system 100.

Figure 9:
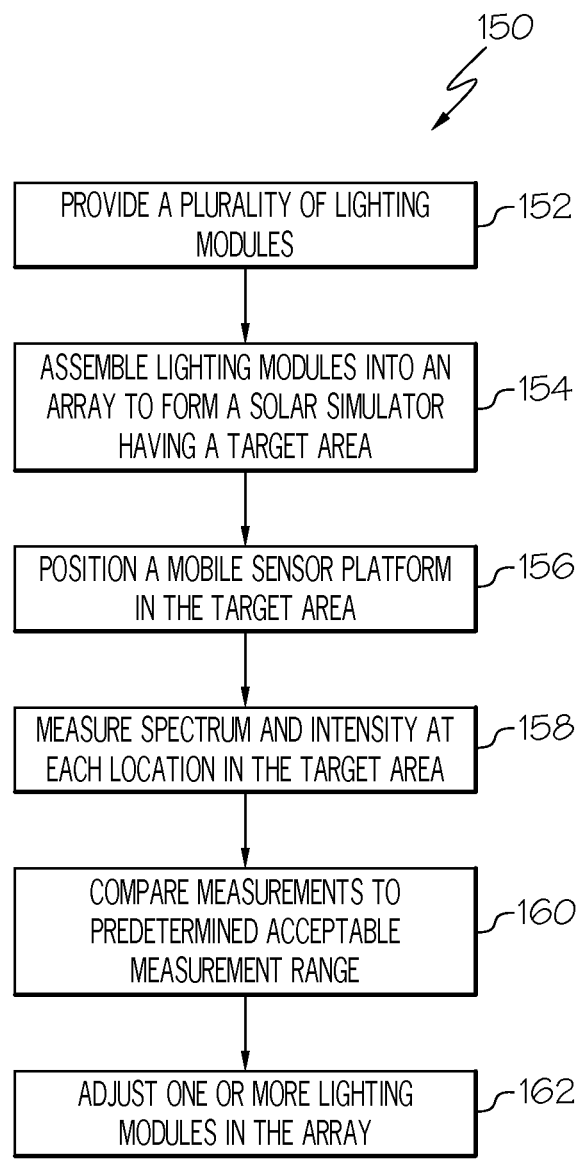
FIG. 9 is a flow chart depicting one embodiment of the disclosed method for solar simulation.

Referring to FIG. 9, one embodiment of the disclosed method for solar simulation, generally designated 150, may begin at block 152 with the step of providing a plurality of lighting modules. Each lighting module may include one or more multi-lamp assemblies, and each multi-lamp assembly may include one or more lamp modules.

At block 154, the lighting modules may be assembled into an array and electrically interconnected and, ultimately, electrically coupled to a power source, thereby forming a solar simulator. The lighting modules may be configured as desired (e.g., into a large array having the desired dimensions). A support structure may be provided and the array may be connected to the support structure.

At block 156, a calibration system may be positioned (at least partially) in the target area of the solar simulator. The calibration system may include a mobile sensor platform configured to move through the target area and sense, for example, the spectrum and intensity of the light generated by the solar simulator.

At block 158, the mobile sensor platform may be moved from location to location within the target area. A measurement (e.g., of the spectrum and intensity) may be taken by the mobile sensor platform at each location.

At block 160, the measurement at each location may be compared to a pre-determined acceptable measurement range for that location. For example, the measured intensity at each location may be compared to an acceptable intensity range for that location and the measured spectrum at each location may be compared to an acceptable spectrum range for that location. Any measurements falling outside of the pre-determined acceptable measurement range may be identified for further action.

At block 162, adjustments may be made to the solar simulator. Specifically, the solar simulator (or one or more lighting modules of the solar simulator) may be manipulated to bring the measured spectrum and intensity at each location within the pre-determined acceptable measurement range. For example, the spectrum and/or intensity may be manipulated by controlling the power (e.g., electrical current) supplied to a particular lighting module, by controlling the power (e.g., electrical current) supplied to adjacent lighting module, such as when a lighting module is malfunctioning, or by manipulating individual lamp modules within a lighting module, as described above.

Figure 10:
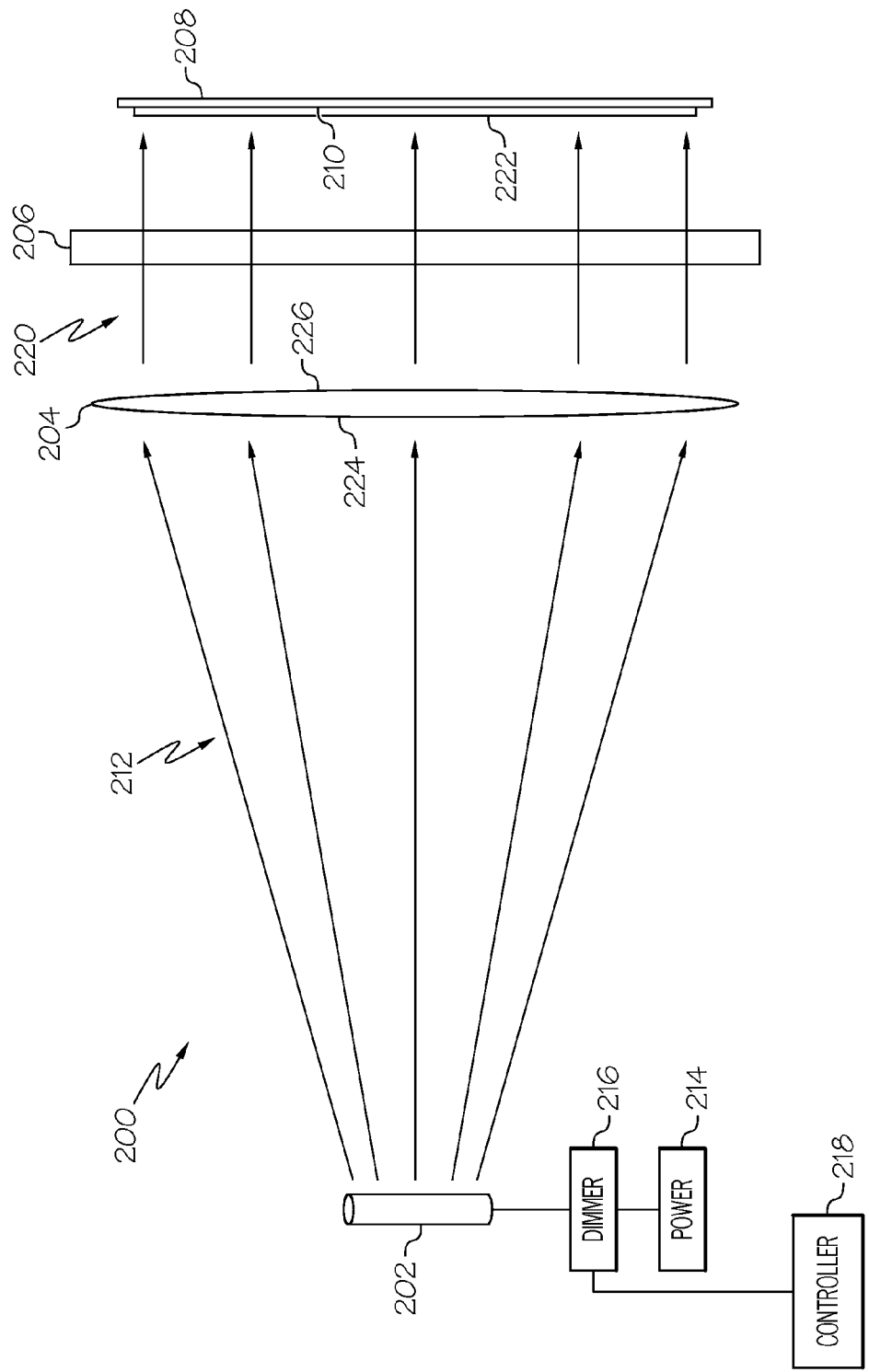
FIG. 10 is a schematic side elevational view of another embodiment of the disclosed solar simulator.

Referring to FIG. 10, another embodiment of the disclosed solar simulator, generally designated 200, may include a light source 202, an optical element 204 and a calibration system 206. The solar simulator 200 may illuminate an object-under-test 208, such as a solar panel, which may include a target surface 210.

The light source 202 may generate an initial light beam 212. The light beam 212 may have an initial intensity and an initial spectral distribution. The initial spectral distribution may overlap the range from infrared to ultraviolet. Optionally, the light source 202 may include a mirror (not shown) to project the initial light beam 212 in the direction of interest, such as toward the optical element 204.

The light source 202 may be any suitable light source having the desired initial spectral distribution. In one particular expression, the light source 202 may generate full spectrum light (i.e., light that substantially covers the electromagnetic spectrum from proximate the infrared to proximate the near ultraviolet). As one general, non-limiting example, the light source 202 may include an electric lamp. As one specific, non-limiting example, the light source 202 may include a xenon arc lamp, such as a CERMAX® brand xenon arc lamp commercially available from Excelitas Technologies Sensors, Inc., and may have a color temperature of about 6,000° K to about 6,500° K. As another specific, non-limiting example, the light source 202 may include a krypton arc lamp and may have a color temperature of about 5,500° K to about 6,000° K. As another general, non-limiting example, the light source 202 may include a plurality of lamps, and the spacing between lamps may be a design consideration.

The light source 202 may receive electrical energy from a power supply 214, such as a battery or the electrical grid. A variable voltage/current device 216, such as a dimmer switch, may control the power supplied to the light source 202. Therefore, the intensity of the initial light beam 212 may be controlled by a controller 218 in communication with the variable voltage/current device 216.

The optical element 204 may receive the initial light beam 212 and may output a collimated light beam 220. The optical element 204 may focus the collimated light beam 220 onto the target surface 210 of the object-under-test 208. Therefore, the collimated light beam 220 may define an area of illumination 222, which may be projected onto the target surface 210 of the object-under-test 208.

Various optical elements may be used to collimate the initial light beam 212 and output the collimated light beam 220. As one particular example, the optical element 204 may be a lens, which may receive the initial light beam 212 at a first side 224 thereof and may output the collimated light beam 220 from a second side 226 thereof.

The collimated light beam 220 may be partially collimated, if not perfectly collimated. The degree of collimation of the collimated light beam 220 may be greater than the degree of collimation, if any, of the initial light beam 212. Those skilled in the art will appreciate that the degree of collimation of the collimated light beam 220 may depend on, among other factors, the type of light source 202 being used, the size of the light source 202, the number and spacing of lamps within the light source 202, the spacing between the light source 202 and the optical element 204 and the focal length of the optical element 204.

The calibration system 206 may be positioned between the optical element 204 and the object-under-test 208. The calibration system 206 may measure various parameters, such as divergence, beam direction, beam spectrum and spatial uniformity, at various locations within the collimated light beam 220. Additionally, the calibration system 206 may correct (e.g., fix or at least balance) certain parameters, such as beam spectrum and spatial uniformity, that fall outside of pre-defined specifications.

Figure 11:
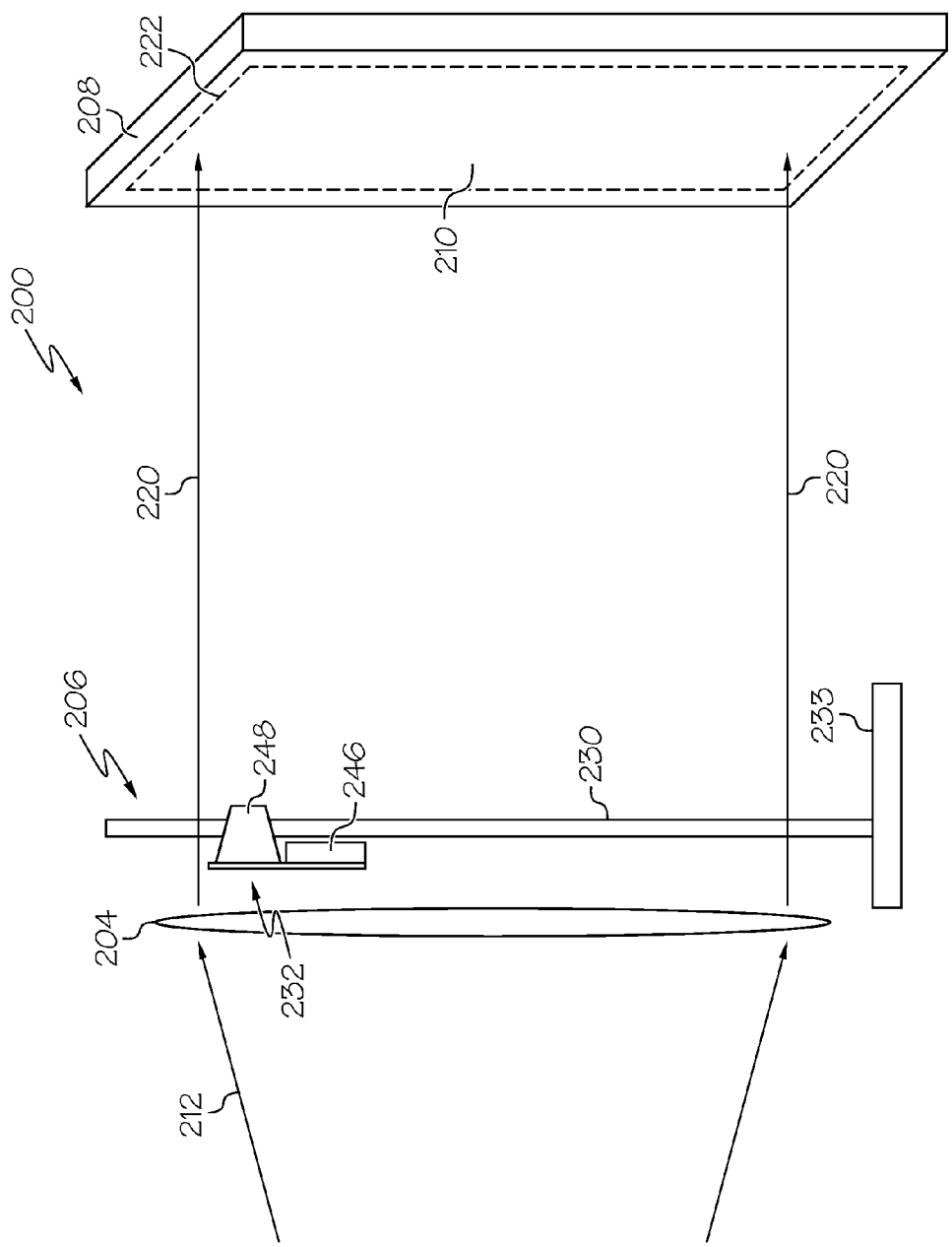
FIG. 11 is a schematic side view of a portion of the solar simulator of FIG. 10.
Figure 12:
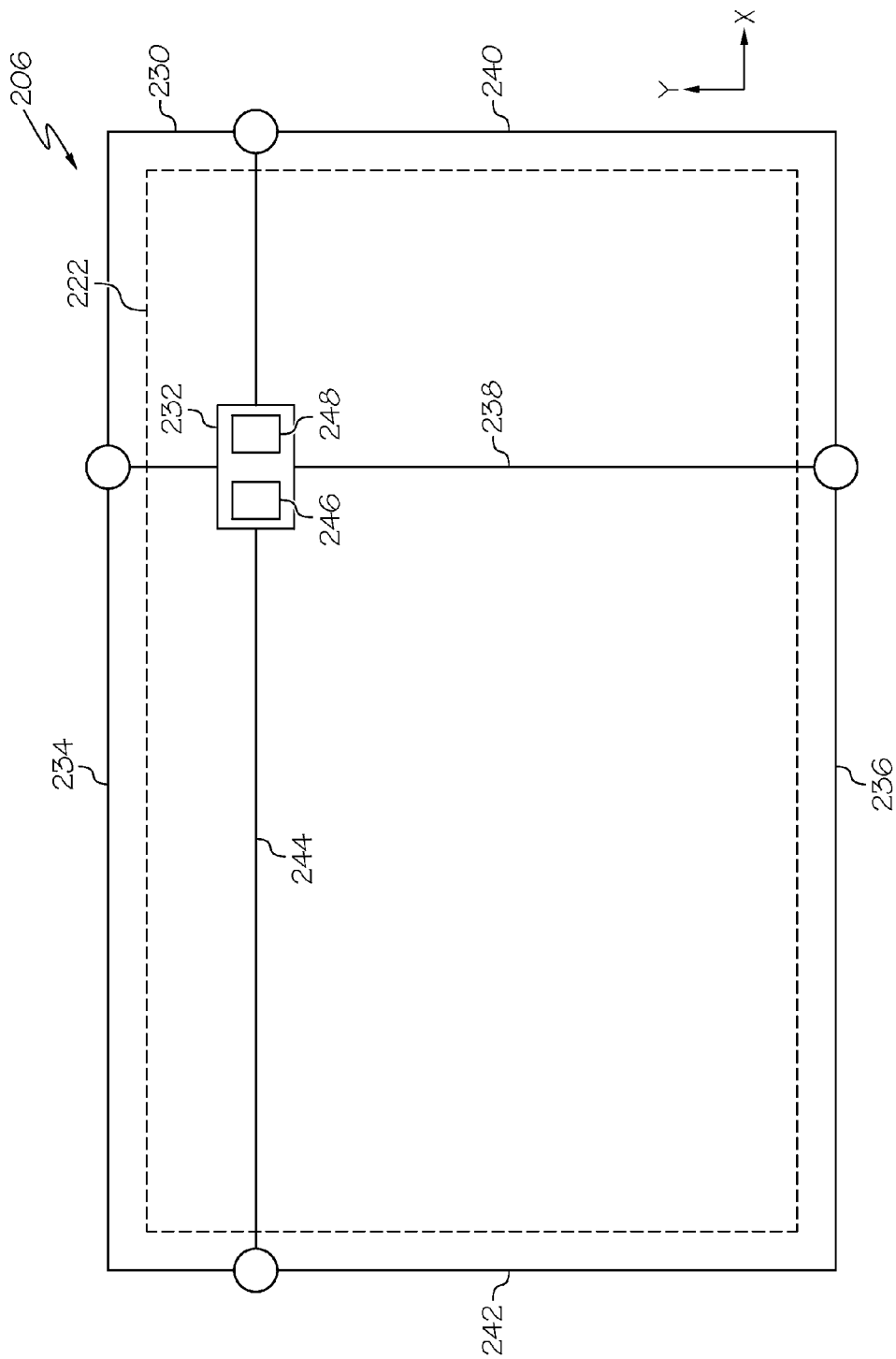
FIG. 12 is a plan view of the calibration system of the solar simulator of FIG. 10.

Referring to FIGS. 11 and 12, the calibration system 206 may include a two-axis stage 230 and a mobile sensor platform 232. A support structure 233 (FIG. 11) may support the two-axis stage 230 and the associated mobile sensor platform 232 such that the calibration system 206 may be positioned in the area of illumination 222 of the collimated light beam 220. The two-axis stage 230 and the mobile sensor platform 232 may be in communication (e.g., one-way or two-way) with the controller 218 (FIG. 10) such that the controller 218 may control the calibration system 206.

The two-axis stage 230 may be any apparatus or system capable of moving the mobile sensor platform 232 through the area of illumination 222 of the collimated light beam 220. Specifically, the two-axis stage 230 may be any apparatus or system capable of moving the mobile sensor platform 232 from discrete location to discrete location within the area of illumination 222 of the collimated light beam 220.

In one example construction, the two-axis stage 230 may include an x-axis linear stage working in unison with a y-axis linear stage. The x-axis linear stage may include support members 234, 236 longitudinally extending along the x-axis and a first cross member 238 moveably connected to the support members 234, 236. The first cross member 238 may translate along the x-axis in response to a force applied to the cross member 238 (e.g., by a motor) that moves the first cross member 238 relative to the support members 234, 236. The y-axis linear stage may include support members 240, 242 longitudinally extending along the y-axis and a second cross member 244 moveably connected to the support members 240, 242. The second cross member 244 may translate along the y-axis in response to a force applied to the second cross member 244 (e.g., by a motor) that moves the second cross member 244 relative to the support members 240, 242.

The mobile sensor platform 232 may be connected proximate the intersection of the first and second cross members 238, 244. Therefore, the two-axis stage 230 may move the mobile sensor platform 232 to various locations within the x-y plane by moving the first and second cross members 238, 244 to positions on the x-axis and the y-axis corresponding to the desired location. The collimated light beam 220 may be generally perpendicular to the x-y plane.

The mobile sensor platform 232 may include a sensor component 246 and a correction component 248. The sensor component 246 of the mobile sensor platform 232 may measure various parameters, such as divergence, beam direction, beam spectrum and spatial uniformity, at various discrete locations within the collimated light beam 220. If one or more parameters, such as beam spectrum and spatial uniformity, falls outside of predefined specifications at a particular location, then the correction component 248 may apply obscurations 250 (FIG. 14) to correct the parameter at that location.

Figure 13:
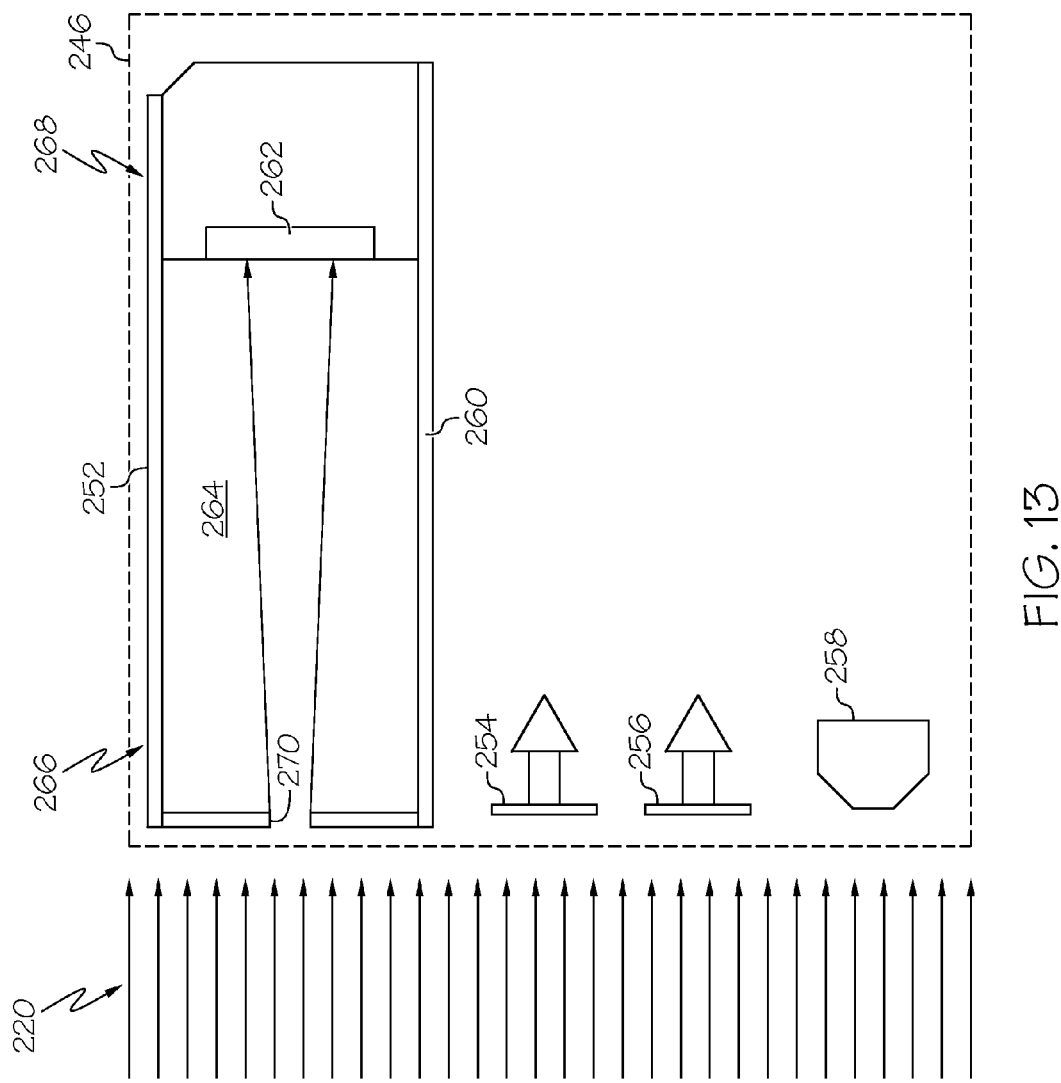
FIG. 13 is a schematic side view of the sensor assembly of the calibration system of FIG. 12.

The sensor component 246 of the mobile sensor platform 232 may include various sensors capable of sensing various parameters, such as divergence, beam direction, beam spectrum and spatial uniformity. Referring to FIG. 13, in one particular implementation, the sensor component 246 of the mobile sensor platform 232 may include an angle/divergence measurement instrument 252, one (or a plurality of) isotype solar cells 254, one (or a plurality of) full solar cells 256 and a spectrometer 258.

The angle/divergence measurement instrument 252 of the sensor component 246 of the mobile sensor platform 232 may measure the divergence and/or the beam direction (e.g., average angle) of the collimated light beam 220. Any sensor capable of measuring the beam direction and/or the divergence may be used as the angle/divergence measurement instrument 252.

In one specific manifestation, the angle/divergence measurement instrument 252 may include a housing 260 and an imaging device 262, such as a charge-coupled device (CCD) array. The housing 260 may define an internal chamber 264 and may include a front end 266 and a rear end 268. The imaging device 262 may be positioned in the internal chamber 264 proximate the rear end 268 of the housing 260. An aperture 270 may be defined at the front end 266 of the housing 260 and may be exposed to the collimated light beam 220. The aperture may have a known size (e.g., a known diameter) and may be spaced from the imaging device 262 by a known distance.

At each discrete location within the collimated light beam 220, a portion of the collimated light beam 220 may enter the housing 260 of the angle/divergence measurement instrument 252 by way of the aperture 270 and may impinge on the imaging device 262. No other light may impinge on the imaging device 262. Therefore, the imaging device 262 may record an image of a portion of the collimated light beam 220 at each discrete location.

The image recorded by the angle/divergence measurement instrument 252 at each discrete location may be analyzed (e.g., by the controller 218 shown in FIG. 10) to obtain divergence and beam direction at each discrete location. The distance from the centroid of the beam may be linearly proportion to the angular content of the beam. Therefore, the beam spatial distribution may provide the angular distribution of the collimated light beam 220. The beam centroid may define the angle of the incoming beam. The integrated power of the entire beam (hitting the imaging device 262) that passes through the aperture 270 may define the power density, which may provide an indication of the spatial uniformity of the collimated light beam 220 and the total power of the collimated light beam 220.

The isotype solar cells 254 and the full solar cells 256 of the sensor component 246 of the mobile sensor platform 232 may measure the response (e.g., current generated) at each discrete location within the collimated light beam 220. Therefore, the isotype solar cells 254 and the full solar cells 256 may facilitate measuring the current-voltage curve at each discrete location. The data collected by the isotype solar cells 254 and the full solar cells 256 may be communication to, and analyzed by, the controller 218 (FIG. 10).

The spectrometer 258 of the sensor component 246 of the mobile sensor platform 232 may record the spectrum at each discrete location within the collimated light beam 220. The data collected by the spectrometer 258 may be communicated to, and analyzed by, the controller 218 (FIG. 10).

Thus, at each discrete location within the collimated light beam 220, the sensor component 246 of the mobile sensor platform 232 may take measurements that facilitate the creation (by controller 218 shown in FIG. 10) of a plot or maps that show the intensity profile, the spectral distribution, the full cell response at each location, the individual isotype responses at each location, the divergence angle at each location and the direction of illumination at each location. From this data, the controller 218 may determine whether the collimated light beam 220 is within specifications. If, at any location, the collimated light beam 220 is outside of one or more specifications (e.g., spatial or spectral specifications), correction parameters may be calculated to produce a more uniform beam for testing. Based on the correction parameters, obscurations 250 (FIG. 14) may be applied to correct the spatial and spectral profiles.

Figure 14:
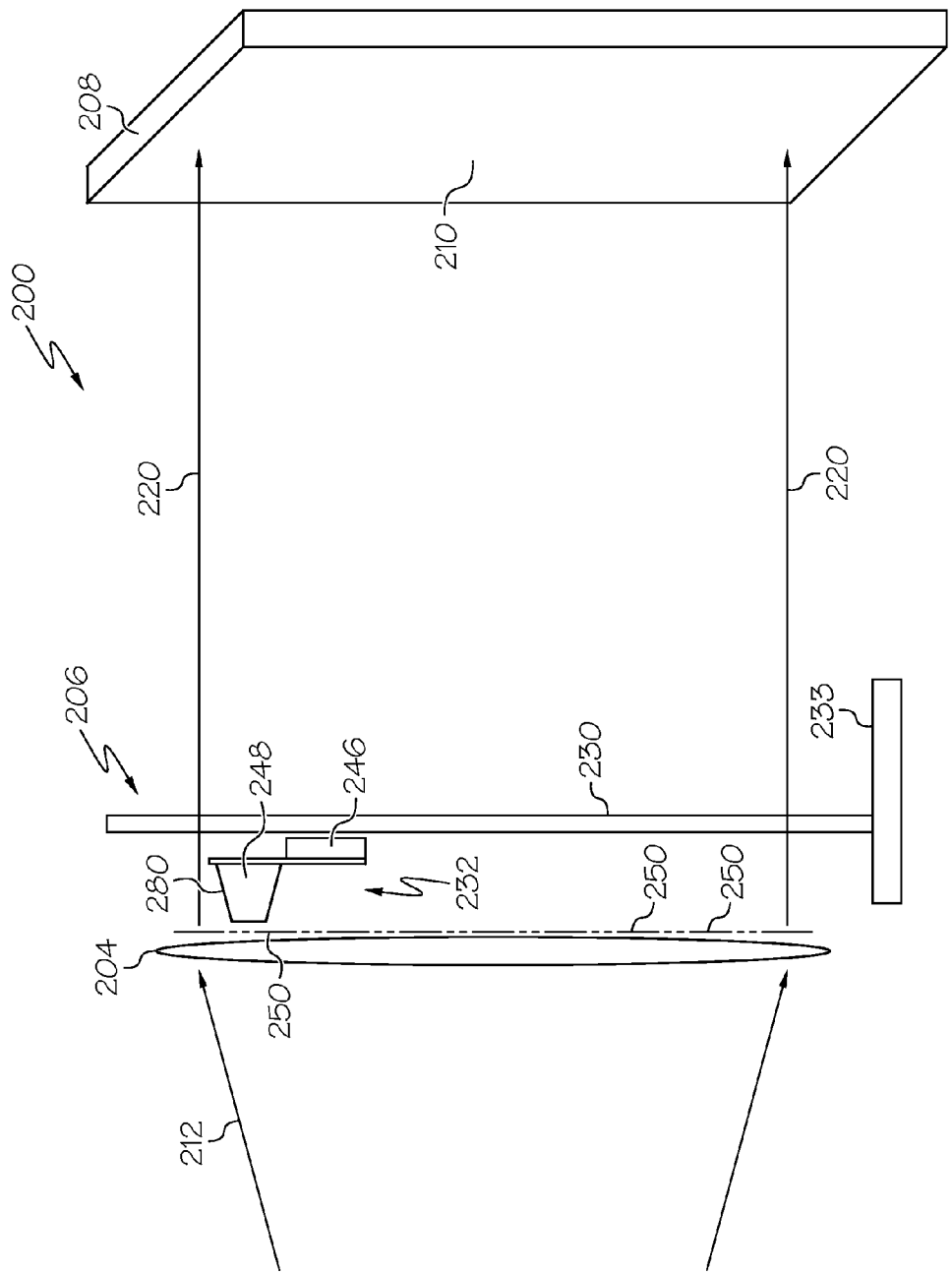
FIG. 14 is a schematic side view of the solar simulator of FIG. 10, shown with the calibration system depositing obscurations onto the optical element.

Referring to FIG. 14, the correction component 248 of the mobile sensor platform 232 may apply obscurations 250 to correct the spatial and spectral profiles at various discrete locations within the collimated light beam 220. While FIG. 14 shows the obscurations 250 being applied directly to the optical element 204 (e.g., the second side 226 of the lens), an optional transmission plate (not shown) may be positioned in the collimated light beam 220 proximate the calibration system 206 (e.g., between the optical element 204 and the calibration system 206) and the obscurations 250 may be applied to the transmission plate.

An obscuration 250 may be any material that, when positioned in the collimated light beam 220, alters the spatial and/or spectral profiles of the collimated light beam 220 proximate the obscuration 250. Certain obscurations 250 may be formed from or may include an optically absorbing/reflecting material, while other obscurations 250 may be formed from of may include a spectrally selective (e.g., filter) material. Those skilled in the art will appreciate that determining whether an optically absorbing/reflecting obscuration 250 or a spectrally selective obscuration 250 is used at a particular location may require consideration of whether a spatial/intensity correction is required or whether a spectral correction is required.

The correction component 248 may initially apply spectrally selective obscurations 250 to correct the spectral distribution at locations within the collimated light beam 220 that require correction. The spectrally selective obscurations 250 may block out (e.g., filter) particular portions of the optical spectrum at certain locations within the collimated light beam 220 to provide the collimated light beam 220 with the desired spectral profile. Non-limiting examples of spectrally selective materials suitable for use as an obscuration 250 include various optical glasses, such as SCHOTT® optical glasses available from Schott AG of Mainz, Germany, and Wratten filters, such as KODAK® Wratten filters.

After applying the spectrally selective obscurations 250 (or, alternatively, at the same time), the correction component 248 may apply optically absorbing/reflecting obscurations 250 to correct the spatial/intensity profile. The optically absorbing/reflecting obscurations 250 may balance the absolute intensity at certain locations within the collimated light beam 220 to provide the collimated light beam 220 with the desired spatial/intensity profile. One non-limiting example of an optically absorbing/reflecting material suitable for use as an obscuration 250 is aluminum tape.

While the composition of the obscurations 250 may dictate whether the obscurations 250 are optically absorbing/reflecting or spectrally selective, the size, shape, position and spatial density of the obscurations 250 may also be design consideration. For example, the obscurations 250 may be dots, tabs or the like, and may be applied in a manner similar to applying labels or stickers to a surface.

In one construction, the correction component 248 of the mobile sensor platform 232 may include a robotic arm 280, as shown in FIG. 14. The robotic arm may be controlled by the controller 218 (FIG. 10) to apply obscurations 250 at desired locations on the optical element 204 (or a transmission plate). However, any mechanical device may be used that is capable of moving an obscuration 250 from the mobile sensor platform 232 to the optical element 204 and depositing the obscuration 250 onto the optical element 204.

Figure 15:
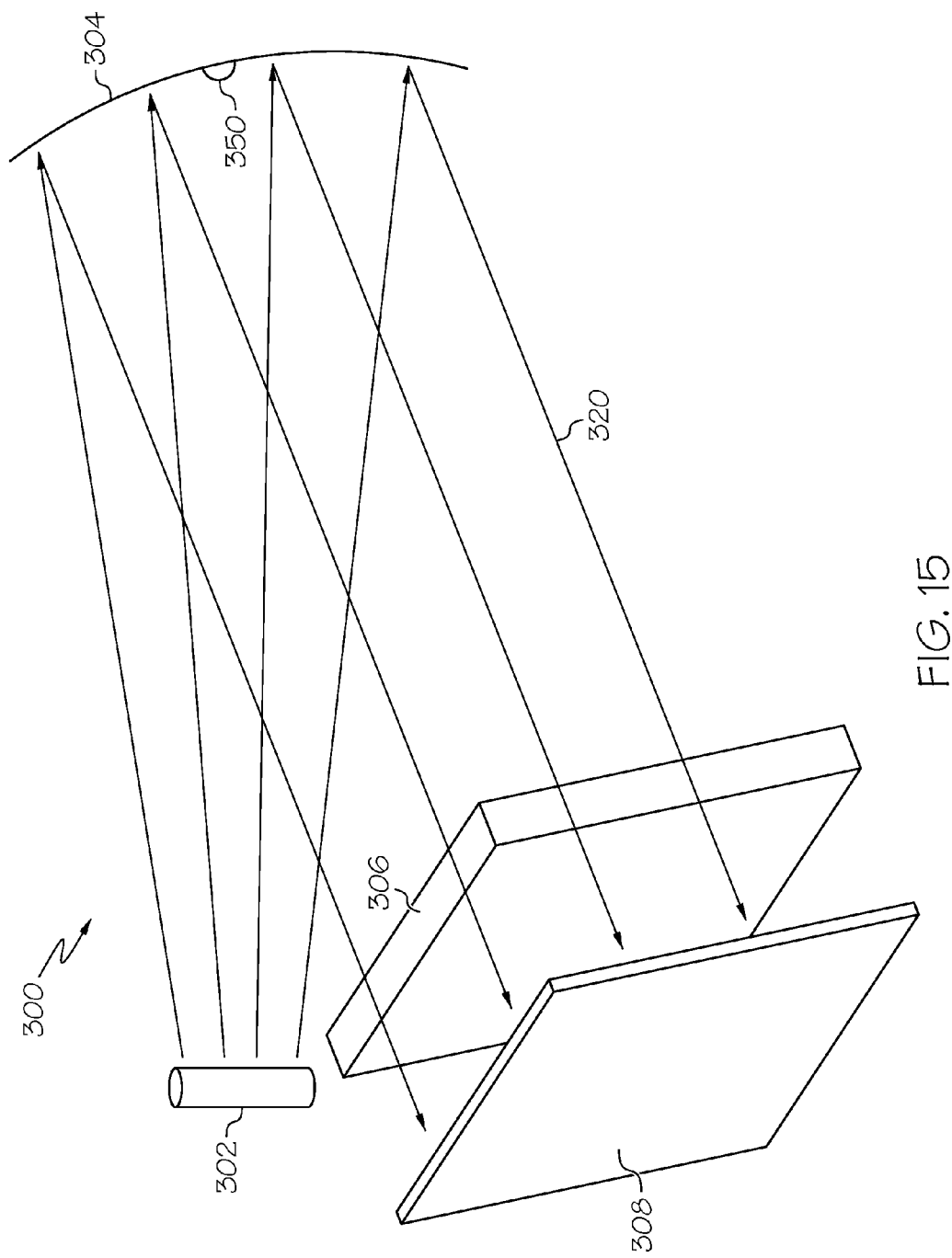
FIG. 15 is a schematic side perspective view of yet another embodiment of the disclosed solar simulator.

Referring to FIG. 15, yet another embodiment of the disclosed solar simulator, generally designated 300, may include a light source 302, an optical element 304 and a calibration system 306. The solar simulator 300 may illuminate an object-under-test 308.

The light source 302 and calibration system 306 of the solar simulator 300 may be configured in a manner as described above in connection with solar simulator 200. However, rather than using a lens, the optical element 304 of solar simulator 300 may include a reflector, as shown in FIG. 15, to produce a collimated light beam 320. Obscurations 350 may be placed directly on the optical element 304 (reflector) or on a transmission plate positioned between the optical element 304 and the object-under-test 308.

Accordingly, solar simulators 200, 300 may generate a collimated light beam, which may be spatially and spectrally balanced by way of calibration systems 206, 306.

Figure 16:
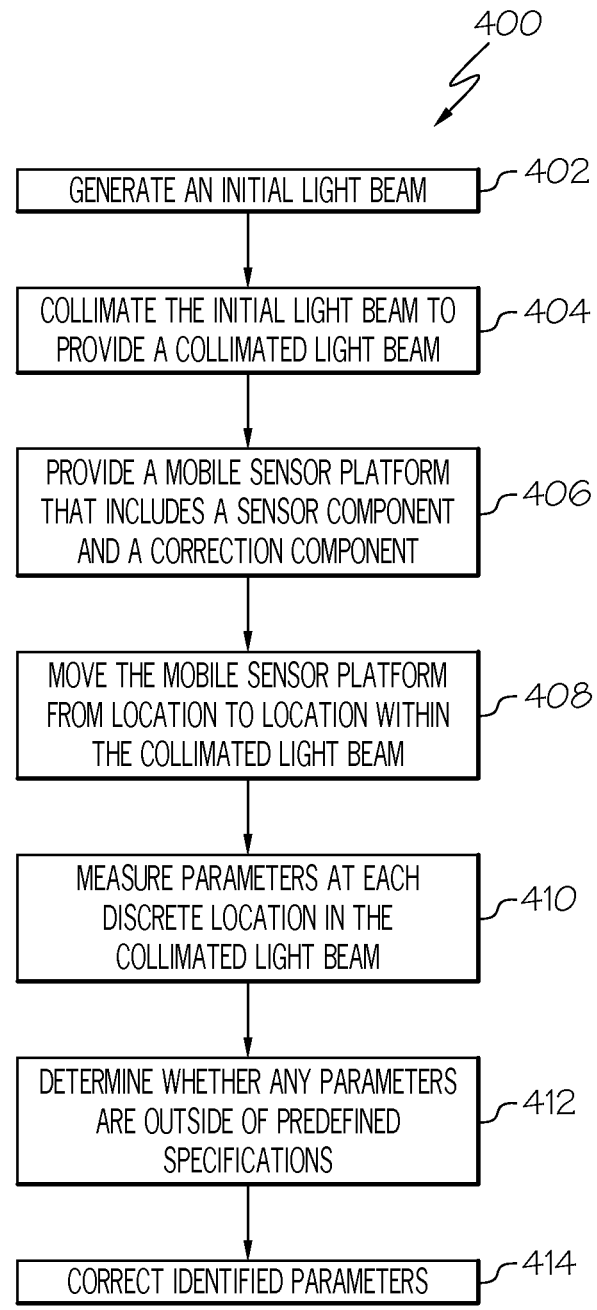
FIG. 16 is a flow chart depicting another embodiment of the disclosed method for solar simulation.

Referring to FIG. 16, another embodiment of the disclosed method for solar simulation, generally designated 400, may begin at block 402 with the step of generating an initial light beam. The initial light beam may have an initial intensity and spectral distribution. For example, the initial light beam may be substantially full spectrum light.

At block 404, the initial light beam may be collimated, at least partially, to produce a collimated light beam. For example, an optical element, such as a lens or reflector, may be positioned to receive the initial light beam and output the collimated light beam.

At block 406, a mobile sensor platform may be provided. The mobile sensor platform may include a sensor component and a correction component. The sensor component may measure various parameters, such as divergence, beam direction, beam spectrum and spatial uniformity, within the collimated light beam. The correction component may apply obscurations to correct certain parameters, such as beam spectrum and spatial uniformity, within the collimated light beam.

At block 408, the mobile sensor platform may be moved from location to location within the collimated light beam. A two-axis stage may be used to move the mobile sensor platform to various discrete locations within the collimated light beam.

At block 410 a measurement may be taken at each discrete location within the collimated light beam. The measurements may facilitate determining the spatial/intensity profile, the spectral distribution, the full cell response at each location, the individual isotype responses at each location, the divergence angle at each location and the direction of illumination at each location.

At block 412, a determination may be made as to whether the collimated light beam is within (or outside of) predefined specifications. Specifically, for each discrete location within the collimated light beam, various parameters, such as divergence, beam direction, beam spectrum and spatial uniformity, may be evaluated to determine whether the parameters are within predefined specifications. Out of specification parameters (at the associated location within the collimated light beam) may be noted.

At block 414, corrections may be made to bring the parameters, such as beam spectrum and spatial uniformity, within the predefined specifications. Obscurations, such as spectrally selective obscurations and/or optically absorbing/reflecting obscurations, may be positioned in the collimated light beam to correct beam spectrum and spatial uniformity.

Although various embodiments of the disclosed solar simulator and method for solar simulation have been shown and described, modifications may occur to those skilled in the art upon reading the specification. The present application includes such modifications and is limited only by the scope of the claims.

What is claimed is:

1. A solar simulator comprising:
   a support structure; and
   a plurality of lighting modules connected to said support structure, wherein each lighting module of said plurality of lighting modules comprises at least one multi-lamp assembly comprising a plurality of lamp modules, wherein each lamp module of said plurality of lamp modules comprises:

a lamp configured to generate light;
a homogenizer having an input end and an output end;
a beam divergence lens positioned to focus said light onto said input end of said homogenizer; and
an imaging lens positioned to receive said light from said output end of said homogenizer and image said light onto a target plane.

2. The solar simulator of claim 1 wherein said plurality of lighting modules are arranged in an array.

3. The solar simulator of claim 2 wherein said array comprises at least two rows.

4. The solar simulator of claim 2 wherein said array is substantially planar.

5. The solar simulator of claim 2 wherein said array is a curvilinear array.

6. The solar simulator of claim 1 wherein each lighting module of said plurality of lighting modules is independently articulable relative to said support structure.

7. The solar simulator of claim 1 further comprising a plurality of articulation mechanisms, wherein each lighting module of said plurality of lighting modules is connected to said support structure by way of an associated articulation mechanism of said plurality of articulation mechanisms.

8. The solar simulator of claim 1 wherein said lighting module further comprises a mounting structure, and wherein said multi-lamp assembly is connected to said mounting structure.

9. The solar simulator of claim 1 wherein said lighting module further comprises electrical interconnects.

10. The solar simulator of claim 1 wherein each lamp module of said plurality of lamp modules further comprises a spectral filter.

11. The solar simulator of claim 1 wherein each lamp module of said plurality of lamp modules further comprises an iris positioned between said imaging lens and said target plane.

12. The solar simulator of claim 1 wherein each lighting module of said plurality of lighting modules comprises a plurality of said multi-lamp assemblies.

13. The solar simulator of claim 1 further comprising a mobile sensor platform comprising:
a support structure;
a sensor connected to said support structure; and
an ambulation system connected to said support structure, wherein said ambulation system is configured to move said mobile sensor platform relative to said plurality of lighting modules.

14. The solar simulator of claim 13 wherein said sensor is configured to sense a light intensity, a light spectrum or a combination thereof.

15. The solar simulator of claim 13 wherein said sensor comprises at least one of a photovoltaic cell and an integrating sphere.

16. The solar simulator of claim 13 wherein said mobile sensor platform further comprises an elevator, and wherein said sensor is connected to said elevator.

17. The solar simulator of claim 13 further comprising a controller in communication with said plurality of lighting modules and said mobile sensor platform.

18. A method for solar simulation comprising the steps of:
providing a plurality of lighting modules that output light, each lighting module of said plurality of lighting modules comprising a multi-lamp assembly comprising a plurality of lamp modules, wherein each lamp module of said plurality of lamp modules comprises:
a lamp configured to generate light;
a homogenizer having an input end and an output end;
a beam divergence lens positioned to focus said light onto said input end of said homogenizer; and
an imaging lens positioned to receive said light from said output end of said homogenizer and image said light onto a target plane;
arranging said lighting modules into an array, said array defining a target area of illumination;
moving a sensor to various discrete locations within said target area;
measuring with said sensor at least one of light intensity and light spectrum at each of said discrete locations; and
based on said measuring step, modifying said light output by at least one lighting module of said plurality of lighting modules.

19. A solar simulator comprising:
a light source configured to generate an initial light beam;
an optical element positioned to receive said initial light beam and output a collimated light beam; and
a mobile sensor platform moveable between a plurality of discrete locations within said collimated light beam, wherein said mobile sensor platform comprises:
a sensor component configured to collect at each discrete location of said plurality of discrete locations data indicative of at least one of divergence of said collimated light beam, direction of said collimated light beam, spectrum of said collimated light beam and spatial uniformity of said collimated light beam; and
a correction component configured to position an obscuration within said collimated light beam.

20. The solar simulator of claim 19 wherein said light source comprises a full spectrum lamp.

21. The solar simulator of claim 19 wherein said optical element comprises a lens.

22. The solar simulator of claim 19 wherein said optical element comprises a reflector.

23. The solar simulator of claim 19 further comprising a two-axis stage connected to said mobile sensor platform.

24. The solar simulator of claim 23 wherein said two-axis stage moves said mobile sensor platform in a plane, and wherein said plane is generally perpendicular to said collimated light beam.

25. The solar simulator of claim 19 wherein said sensor component comprises an angle/divergence measurement instrument, and wherein said angle/divergence measurement instrument comprises:
a housing that defines an internal chamber and an aperture into said internal chamber; and
an imaging device positioned in said internal chamber, said imaging device being opposed from said aperture.

26. The solar simulator of claim 25 wherein said imaging device comprises a charge-coupled device array.

27. The solar simulator of claim 25 wherein said sensor component further comprises an isotype solar cell, a full solar cell or a combination thereof.

28. The solar simulator of claim 27 wherein said sensor component further comprises a spectrometer.

29. The solar simulator of claim 19 wherein said correction component comprises a robotic arm.

30. The solar simulator of claim 19 wherein said obscuration includes a spectrally selective material, an optically absorbing/reflecting material or a combination thereof.

31. A method for solar simulation comprising the steps of:
generating a collimated light beam;
moving a mobile sensor platform to a plurality of discrete locations within said collimated light beam;

at each discrete location of said plurality of discrete locations, collecting with said mobile sensor platform data indicative of a plurality of parameters;

for each discrete location of said plurality of discrete locations, determining whether any of said plurality of parameters are outside of predefined specifications; and positioning an obscuration in said collimated light beam.

32. The method of claim 31 wherein said generating step comprises focusing an initial light beam with an optical element.

33. The method of claim 32 wherein said optical element comprises one of a lens and a reflector.

34. The method of claim 31 wherein said mobile sensor platform moves through an x-y plane, and wherein said collimated light beam is generally perpendicular to said x-y plane.

35. The method of claim 31 wherein said plurality of parameters comprises divergence of said collimated light beam, direction of said collimated light beam, spectrum of said collimated light beam and spatial uniformity of said collimated light beam.

36. The method of claim 31 wherein said mobile sensor platform comprises an angle/divergence measurement instrument, and wherein said angle/divergence measurement instrument comprises:

a housing that defines an internal chamber and an aperture into said internal chamber; and an imaging device positioned in said internal chamber, said imaging device being opposed from said aperture.

37. The method of claim 36 wherein said mobile sensor platform further comprises an isotype solar cell, a full solar cell, a spectrometer, or a combination thereof.

38. The method of claim 31 wherein said obscuration is position to correct a spectrum of said collimated light beam, a spatial uniformity of said collimated light beam, or a combination thereof.

* * * * *